(12) United States Patent
LaTurner et al.

(10) Patent No.: US 8,074,761 B2
(45) Date of Patent: Dec. 13, 2011

(54) CRASH ATTENUATOR

(75) Inventors: John F. LaTurner, Carmichael, CA (US); Michael J. Buehler, Roseville, CA (US); Brent S. Sindorf, Roseville, CA (US)

(73) Assignee: Energy Absorption Systems, Inc., Dallas, TX (US)

( * ) Notice: Subject to any disclaimer, the term of this patent is extended or adjusted under 35 U.S.C. 154(b) by 207 days.

(21) Appl. No.: 12/349,056

(22) Filed: Jan. 6, 2009

(65) Prior Publication Data
US 2009/0174200 A1 Jul. 9, 2009

Related U.S. Application Data

(60) Provisional application No. 61/019,488, filed on Jan. 7, 2008.

(51) Int. Cl.
*B60R 19/34* (2006.01)
*E01F 15/14* (2006.01)

(52) U.S. Cl. ....... 180/274; 280/784; 256/13.1; 188/371; 293/132

(58) Field of Classification Search .......... 180/274; 280/784; 404/6, 9; 256/13.1; 293/132–137; 296/187.05, 187.07–187.09, 187.11; 188/371–377
See application file for complete search history.

(56) References Cited

U.S. PATENT DOCUMENTS

| | | | |
|---|---|---|---|
| 1,511,264 A | 10/1924 | Carter | |
| 1,799,894 A | * 4/1931 | Fritsch | 293/134 |
| 2,391,275 A | 12/1945 | Shaw | |
| 2,483,655 A | 10/1949 | Schultz | |
| 2,578,903 A | 12/1951 | Smith | |
| 2,870,871 A | 1/1959 | Stevinson | |
| 2,979,163 A | 4/1961 | Van Zelm et al. | |
| 2,980,213 A | 4/1961 | Van Zelm et al. | |
| 3,017,163 A | 1/1962 | Van Zelm et al. | |
| 3,087,584 A | 4/1963 | Jackson et al. | |
| 3,132,721 A | 5/1964 | Jackson | |
| 3,143,321 A | 8/1964 | McGehee et al. | |
| 3,146,014 A | 8/1964 | Kroell | |
| 3,181,821 A | 5/1965 | Webb | |
| 3,195,685 A | 7/1965 | Blackstone | |

(Continued)

FOREIGN PATENT DOCUMENTS

EP 0 042 645 A2 12/1981

(Continued)

OTHER PUBLICATIONS

Energy Absorption Systems, Inc., Quest™ Impact Attenuator, NCHRP 350, 1 page.

(Continued)

*Primary Examiner* — Ruth Ilan
(74) *Attorney, Agent, or Firm* — Brinks Hofer Gilson & Lione

(57) ABSTRACT

A crash attenuator for decelerating an impacting vehicle includes a first end that can be releasably secured to a vehicle, and a second end that is longitudinally spaced from the first end. The second end includes an impact member that is movable in the longitudinal direction from a pre-impact position to an impact position. At least a pair of deformable attenuator members are spaced laterally and extend longitudinally between the first and second ends. At least a portion of the attenuators are bent in a non-outboard direction when the impact member moves from the pre-impact position to the impact position.

19 Claims, 13 Drawing Sheets

U.S. PATENT DOCUMENTS

| | | | |
|---|---|---|---|
| 3,211,260 A | 10/1965 | Jackson | |
| 3,236,333 A | 2/1966 | Mitchell | |
| 3,307,832 A | 3/1967 | Van Zelm et al. | |
| 3,308,908 A | 3/1967 | Bunn | |
| 3,337,004 A | 8/1967 | Hoffman et al. | |
| 3,372,773 A | 3/1968 | Russo et al. | |
| 3,377,044 A | 4/1968 | Jackson et al. | |
| 3,451,319 A | 6/1969 | Gubela | |
| 3,486,791 A | 12/1969 | Stoffel et al. | |
| 3,547,468 A | 12/1970 | Giuffrida | |
| 3,561,690 A | 2/1971 | Muskat | |
| 3,604,285 A | 9/1971 | Olsson | |
| 3,674,115 A | 7/1972 | Young et al. | |
| 3,719,255 A | 3/1973 | Daniels et al. | |
| 3,730,586 A | 5/1973 | Eggert | |
| 3,768,781 A | 10/1973 | Walker et al. | |
| 3,820,634 A | 6/1974 | Poe | |
| 3,904,237 A * | 9/1975 | Barenyi et al. | 293/155 |
| 3,944,187 A | 3/1976 | Walker | |
| 3,968,863 A | 7/1976 | Reilly | |
| 3,982,734 A | 9/1976 | Walker | |
| 4,027,905 A | 6/1977 | Shimogawa et al. | |
| 4,150,805 A | 4/1979 | Mazelsky | |
| 4,190,276 A * | 2/1980 | Hirano et al. | 293/133 |
| 4,200,310 A | 4/1980 | Carney | |
| 4,223,763 A | 9/1980 | Duclos et al. | |
| 4,289,419 A | 9/1981 | Young et al. | |
| 4,358,136 A | 11/1982 | Tsuge et al. | |
| 4,399,980 A | 8/1983 | van Schie | |
| 4,452,431 A * | 6/1984 | Stephens et al. | 256/13.1 |
| 4,583,716 A | 4/1986 | Stephens et al. | |
| 4,630,716 A | 12/1986 | Faust | |
| 4,784,515 A | 11/1988 | Krage et al. | |
| 4,815,565 A | 3/1989 | Sicking et al. | |
| 4,844,213 A | 7/1989 | Travis | |
| 4,928,928 A | 5/1990 | Buth et al. | |
| 5,022,782 A * | 6/1991 | Gertz et al. | 404/6 |
| 5,074,391 A | 12/1991 | Rosenzweig | |
| 5,078,366 A | 1/1992 | Sicking et al. | |
| 5,193,764 A | 3/1993 | Larratt et al. | |
| 5,199,755 A * | 4/1993 | Gertz | 293/120 |
| 5,391,016 A | 2/1995 | Ivey et al. | |
| 5,407,298 A | 4/1995 | Sicking et al. | |
| 5,487,562 A | 1/1996 | Hedderly et al. | |
| 5,547,309 A | 8/1996 | Mak et al. | |
| 5,597,055 A | 1/1997 | Han et al. | |
| 5,634,738 A | 6/1997 | Jackson et al. | |
| 5,642,792 A | 7/1997 | June | |
| 5,697,657 A * | 12/1997 | Unrath, Sr. | 293/118 |
| 5,775,675 A * | 7/1998 | Sicking et al. | 256/13.1 |
| 5,791,812 A | 8/1998 | Ivey | |
| 5,797,591 A | 8/1998 | Krage | |
| 5,868,521 A * | 2/1999 | Oberth et al. | 404/6 |
| 5,902,068 A | 5/1999 | Angley et al. | |
| 5,924,680 A | 7/1999 | Sicking et al. | |
| 5,947,452 A | 9/1999 | Albritton | |
| 6,004,006 A | 12/1999 | Wang | |
| 6,004,066 A | 12/1999 | Niemerski | |
| 6,024,383 A | 2/2000 | Fohl | |
| 6,082,926 A | 7/2000 | Zimmer | |
| 6,109,597 A | 8/2000 | Sicking et al. | |
| 6,126,144 A * | 10/2000 | Hirsch et al. | 256/13.1 |
| 6,179,516 B1 | 1/2001 | Ivey et al. | |
| 6,203,079 B1 | 3/2001 | Breed | |
| 6,293,205 B1 | 9/2001 | Butler | |
| 6,293,727 B1 | 9/2001 | Albritton | |
| 6,308,309 B1 | 10/2001 | Gan et al. | |
| 6,308,809 B1 | 10/2001 | Reid et al. | |
| 6,394,241 B1 | 5/2002 | Pesjardins et al. | |
| 6,457,570 B2 | 10/2002 | Reid et al. | |
| 6,523,872 B2 * | 2/2003 | Breed | 293/119 |
| 6,536,985 B2 | 3/2003 | Albritton et al. | |
| 6,668,989 B2 | 12/2003 | Reid et al. | |
| 6,719,483 B1 | 4/2004 | Welandsson | |
| 6,854,716 B2 * | 2/2005 | Bronstad | 256/13.1 |
| 6,926,324 B1 * | 8/2005 | Gertz | 293/133 |
| 6,962,245 B2 | 11/2005 | Ray et al. | |
| 7,063,364 B2 | 6/2006 | Bird et al. | |
| 7,185,882 B2 | 3/2007 | Buth et al. | |
| 7,325,789 B2 | 2/2008 | Buth | |
| 7,341,397 B2 * | 3/2008 | Murphy | 404/6 |
| 7,396,184 B2 | 7/2008 | LaTurner et al. | |
| 7,438,337 B1 * | 10/2008 | Gertz | 293/133 |
| 7,484,906 B2 | 2/2009 | La Turner et al. | |
| 7,572,022 B2 * | 8/2009 | Groeneweg | 362/26 |
| 2003/0175076 A1 | 9/2003 | Albritton | |
| 2004/0141808 A1 | 7/2004 | Allen et al. | |
| 2006/0151986 A1 | 7/2006 | Reid et al. | |
| 2007/0018720 A1 * | 1/2007 | Wright | 330/51 |
| 2007/0682442 | 6/2007 | Buth | |

FOREIGN PATENT DOCUMENTS

| | | |
|---|---|---|
| EP | 0 286 782 A1 | 10/1988 |
| WO | WO 97/47495 A1 | 12/1997 |
| WO | WO 98/44203 | 10/1998 |
| WO | WO 00/68594 A1 | 11/2000 |
| WO | WO 03/102402 A2 | 12/2003 |

OTHER PUBLICATIONS

Safety Trailers, Inc. TTMA-100, Exclusive Distributor for STI TTMA-100, http://gsihighway.com/safetytrailers.htm, obtained Jun. 27, 2007, 2 pages.

Safety Trailers, Inc., *TTMA in tow—no need to stow, use at any speed*, www.safetytrailers.com, 2 pages.

Safety Trailers, Inc., TTMA-100—Trailer TMA General Specifications, 5 pages.

"Technical Summary of the TTMA-100," date unknown, 1 page.

Vägverket, *Pocket Facts 2006, Swedish Road Administration, Roads and Traffic*, Publication 2006:23E, 52 pages.

M. H. Ray et al., "Side Impact Crash Testing", Report FHWA-RD-92-052, Test No. 91S046, Mar. 1992, Federal Highway Admin., McLean, VA., pp. 1-34.

M. H. Ray et al., "Side Impact Crash Test and Evaluation Procedures for Roadside Structure Crash Test", Report FHWA-RD-92-062, May 1993, Fed. Hwy. Admin., McLean, VA., pp. 1-28.

M. H. Ray et al., "Side Impact Crash Testing of Roadside Structures", Report FHWA-RD-92-079, May 1993, Fed. Hwy. Admin., McLean, VA., pp. 1-78.

M. H. Ray et al., "Severity Measures in Side-Impacts with Narrow Roadside Structures", J. Transportation Eng., 120(2):322-338, Mar.-Apr. 1994.

M. H. Ray et al., "Test and Evaluation Criteria for Side-Impact Roadside Appurtenance Collisions", J. Transportation Eng., 120(4):633-651, Jul.-Aug. 1994.

M. H. Ray et al., "Side Impact Crash Test and Evaluation Criteria for Roadside Safety Hardware", General Design and Roadside Safety Features, Transportation Research Record No. 1647, T.R.B., Washington, D.C., pp. 1-17, Jan. 1998.

M. H. Ray et al., "Evaluating Human Risk in Side Impact Collisions with Roadside Objects", Paper No. 00-0250, Transportation Research Board 79th Annual Meeting, Washington, DC, Jan. 9-13, 2000, pp. 1-16.

B. G. Pfeifer et al., "Development of a Metal Cutting W-Beam Guardrail Terminal", Transportation Research Report TRP-03-43-94, Sep. 1994, Fed. Hwy. Admin., 57 pages.

Road Systems, Inc.—Beat & Beat-MT, "Beat Box Beam Bursting Energy Absorbing Terminals", obtained at the internet address http://www.roadsystems.com/beat.htm, 2 pages, Jan. 2004.

Road Systems, Inc.—Fleat, "How the Fleat Functions" obtained at the internet address http://www.roadsystems.com/fleat.htrn, 2 pages, Jan. 2004.

Road Systems, Inc.—SKT, "How the SKT Functions" obtained at the internet address http://www.roadsystems.com/skt.htm, 2 pages, Jan. 2004.

Road Systems, Inc.—Fleat-MT, "How the Fleat-MT Functions" obtained at the internet address http://www.roadsystems.com/fleatmt.htm, 1 page, Jan. 2004.

Trinity Industries, Inc., "Products-Taking Highway Safety Into the 21st Century!, TRACC Family", obtained at the internet address http://www.highwayguardrail.com/Products%20-%20TRACC%20FAMILY.html 4 pages, Jan. 2004.

Energy Absorption Systems, Inc., Quest™ Impact Attenuator, NCHRP 350, 1 page.

Safety Trailers, Inc. TTMA-100, Exclusive Distributor for STI TTMA-100, http://gsihighway.com/safetytrailers.htm, obtained Jun. 27, 2007, 2 pages.

Safety Trailers, Inc., *TTMA in tow—no need to stow, use at any speed*, www.safetytrailers.com, 2 pages.

Safety Trailers, Inc., TTMA-100—Trailer TMA General Specifications, 5 pages.

"Technical Summary of the TTMA-100," date unknown, 1 page.

*Vägverket, Pocket Facts 2006, Swedish Road Administration, Roads and Traffic*, Publication 2006:23E, 52 pages.

M. H. Ray et al., "Side Impact Crash Testing", Report FHWA-RD-92-052, Test No. 91S046, Mar. 1992, Federal Highway Admin., McLean, VA., pp. 1-34.

M. H. Ray et al., "Side Impact Crash Test and Evaluation Procedures for Roadside Structure Crash Test", Report FHWA-RD-92-062, May 1993, Fed. Hwy. Admin., McLean, VA., pp. 1-28.

M. H. Ray et al., "Side Impact Crash Testing of Roadside Structures", Report FHWA-RD-92-079, May 1993, Fed. Hwy. Admin., McLean, VA., pp. 1-78.

M. H. Ray et al., "Severity Measures in Side-Impacts with Narrow Roadside Structures", J. Transportation Eng., 120(2):322-338, Mar.-Apr. 1994.

M. H. Ray et al., "Test and Evaluation Criteria for Side-Impact Roadside Appurtenance Collisions", J. Transportation Eng., 120(4):633-651, Jul.-Aug. 1994.

M. H. Ray et al., "Side Impact Crash Test and Evaluation Criteria for Roadside Safety Hardware", General Design and Roadside Safety Features, Transportation Research Record No. 1647, T.R.B., Washington, D.C., pp. 1-17, Jan. 1998.

M. H. Ray et al., "Evaluating Human Risk in Side Impact Collisions with Roadside Objects", Paper No. 00-0250, Transportation Research Board $79^{th}$ Annual Meeting, Washington, DC, Jan. 9-13, 2000, pp. 1-16.

B. G. Pfeifer et al., "Development of a Metal Cutting W-Beam Guardrail Terminal", Transportation Research Report TRP-03-43-94, Sep. 1994, Fed. Hwy. Admin., 57 pages.

Road Systems, Inc.—Beat & Beat-MT, "Beat Box Beam Bursting Energy Absorbing Terminals", obtained at the internet address http://www.roadsystems.com/beat.htm, 2 pages, Jan. 2004.

Road Systems, Inc.—Fleat, "How the Fleat Functions" obtained at the internet address http://www.roadsystems.com/fleat.htm, 2 pages, Jan. 2004.

Road Systems, Inc.—SKT, "How the SKT Functions" obtained at the internet address http://www.roadsystems.com/skt.htm, 2 pages, Jan. 2004.

Road Systems, Inc.—Fleat-MT, "How the Fleat-MT Functions" obtained at the internet address http://www.roadsystems.com/fleatmt.htm, 1 page, Jan. 2004.

Trinity Industries, Inc., "Products-Taking Highway Safety Into the $21^{st}$ Century!, TRACC Family", obtained at the internet address http://www.highwayguardrail.com/Products%20-%20TRACC%20FAMILY.html, 4 pages, Jan. 2004.

\* cited by examiner

CRASH ATTENUATOR

This application claims the benefit of U.S. Provisional Application No. 61/019,488, filed Jan. 7, 2008, the entire disclosure of which is hereby incorporated herein by reference.

BACKGROUND

The present invention generally relates to a crash attenuator capable of attenuating energy during a crash, and in particular, a crash attenuator coupled to a vehicle such as a truck.

Crash cushions, for example truck mounted attenuators (TMAs), are commonly used to protect utility vehicles and workers engaged in roadside construction or maintenance, as well as the occupants of cars traveling on the roadways, in the event of a collision. TMAs are designed to safely stop an errant vehicle from an otherwise dangerous and potentially fatal collision with the rear end of an unprotected utility vehicle. Typically, TMAs are secured to the rear of the utility vehicle and cantilevered away from the vehicle in a rearward direction. In other embodiments, TMAs are configured as towable trailers.

One criteria for measuring the effectiveness of a TMA is through the crash test specification outlined in the National Cooperative Highway Research Report 350 "Recommended Procedures of the Safety Performance Evaluation of Highway Features," or NCHRP 350. Under the tests in this specification, an occupant of both light and heavy vehicles must experience less than a 12 m/s change in velocity (delta($\Delta$)V) upon contacting the vehicle interior and less than a 20 g deceleration after contact.

Unlike ground mounted crash cushions, TMAs cannot rely on tracks, cables, or rails to help stabilize energy absorbing materials acting in compression. In the event the energy absorbing material should become unstable, the TMA's ability to effectively absorb energy could be compromised. Many prior art systems have employed large bearing areas or collapsible frame linkages to prevent buckling of the energy absorbing materials as they are compressed during vehicle impact. However, collapsible frame linkages and the like can be complicated and expensive to manufacture.

Furthermore, many existing TMAs create sharp metal debris, as a result of the energy absorption process, that pose serious safety hazards to roadway workers in the vicinity of the TMA, as well as the driver and passengers of the impacting vehicle. Thus, a need presently exists for a crash attenuator that meets the NCHRP 350 standards, is relatively inexpensive to manufacture, and prevents debris from producing a hazard to roadway workers in the vicinity of the TMA, or to the driver and passengers of the impacting vehicle.

BRIEF SUMMARY

In one aspect, a crash attenuator includes a first end adapted to be releasably secured to a vehicle, and a second end that is longitudinally spaced from the first end. The second end includes an impact member that is moveable in the longitudinal direction from a pre-impact position to an impact position. The crash attenuator also includes at least a pair of laterally spaced deformable attenuator members extending in a longitudinal direction that, in one embodiment, have a circular cross section. When a vehicle impacts the crash attenuator, at least a portion of the deformable attenuator members are bent in a non-outboard direction as the impact member is moved from the pre-impact position to the impact position.

In another aspect, a crash attenuator includes a first end adapted to be releasably secured to a vehicle, and a second end that is longitudinally spaced from the first end. The second end includes an impact member that is moveable in the longitudinal direction from a pre-impact position to an impact position. The crash attenuator also includes at least one pair of spaced apart deformable attenuator members. The deformable attenuator members have a proximal end and a distal end. The proximal ends are positioned downstream from the impact member in a longitudinally staggered relationship when the impact member is in the pre-impact position. When the impact member moves from the pre-impact position to the impact position, at least a portion of the deformable attenuator members are bent in a non-outboard direction.

In yet another aspect, a crash attenuator includes a first end and a second end that is longitudinally spaced from the first end. An impact member is movably located at the second end. The crash attenuator also includes an energy absorbing member disposed between the first and second ends. The energy absorbing member is configured to absorb energy when the impact member is moved from a pre-impact position to an impact position. The impact member includes an impact surface having a substantially central portion lying substantially in a laterally extending vertical plane, and opposite side portions that extend laterally outward and longitudinally toward the first end from the central portion, such that each of the side portions is non-parallel to the vertical plane.

In one embodiment, a crash attenuator includes a first end and a second end that is longitudinally spaced from the first end. An impact member is movably located at the second end. The crash attenuator also includes an energy absorbing member disposed between the first and second ends. The energy absorbing is configured to absorb energy when the impact member is moved from a pre-impact position to an impact position. At least a pair of deforming members is coupled to each of the opposite sides of the impact member. Each pair of deforming members includes an inboard deforming member positioned adjacent to an inboard side of the deformable attenuator member, and an outboard deforming member positioned adjacent to an outboard side of the deformable attenuator member. The outboard deforming member is positioned longitudinally downstream from the inboard deforming member.

A method of decelerating a vehicle with a crash attenuator includes providing a crash attenuator that includes a first end that is adapted to be releasably secured to a vehicle, and a second end that is longitudinally spaced from the first end and includes an impact member, at least a pair of laterally spaced deformable attenuator members extending in a longitudinal direction, a deforming member that is disposed around and engaged with a portion of at least one of the deformable attenuator members, and a deflecting member disposed at the first end; impacting the impact member with a vehicle; deforming the deformable attenuator members with the deforming member downstream of the impact member; and forcing the deformed attenuator members against the deflecting member, and thereby bending the deformable attenuator members in a non-outboard direction.

In another aspect, a method of decelerating a vehicle with a crash attenuator includes providing a crash attenuator including an impact member, at least a pair of laterally spaced deformable attenuator members having a circular cross section and extending in a longitudinal direction, a deflecting member, and a suspension member that is fixedly coupled to the impact member such that it is movable with the impact member; spacing the deformable attenuator members away from the deflecting member, such that when a vehicle impacts the impacting member, the first end does not immediately engage the deflecting member; impacting the impact member with a vehicle; and bending the deformable attenuator members when the impact member moves from a pre-impact position to an impact position.

In another aspect, a crash attenuator includes a first end that is secured to a vehicle and a second end that includes an impact member and is longitudinally spaced from the first end. The crash attenuator also includes a suspension member that is fixedly coupled to the impact member and moveable therewith, and an attenuator member disposed between the first and second ends. When the impact member moves from a pre-impact position to an impact position, the attenuator member is configured to deform and thereby absorb energy.

The crash attenuator provides significant advantages over other crash attenuators. For example and without limitation, the deformable attenuator members provide the energy dissipation while also serving as the framework for the attenuator, thereby reducing the cost and complexity of the system. In addition, the deformable members are deformed, for example by shaping and/or bending, and are not severed or ruptured into various pieces. As such, the system remains intact and does not produce loose road debris.

In one embodiment, the deformable members are deformed in a non-outboard direction, such that they do not provide a snagging or spearing component. In one embodiment, the staggered configuration of the deformable members provides a more even ride-down distribution. In addition, the shape and configuration impact surface and member helps to ensure that the central portion thereof is the first and primary area to engage an impacting vehicle, thereby reducing an eccentric loading of the laterally spaced deformable members.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE DRAWINGS AND THE PRESENTLY PREFERRED EMBODIMENTS

Figure 1:
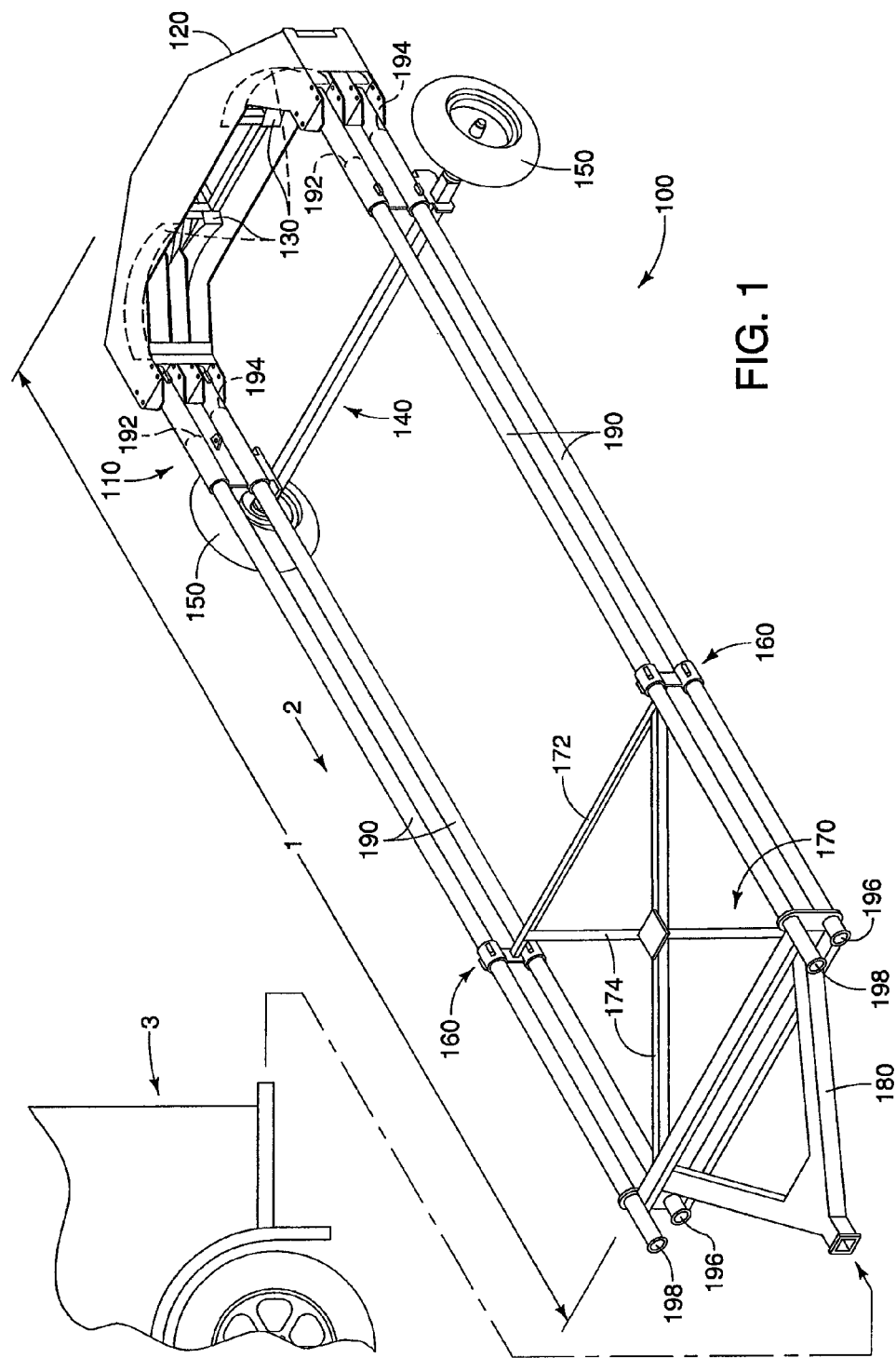
FIG. 1 is a perspective view of a first embodiment of a crash attenuator.

The term "longitudinal" refers to the lengthwise direction 1 between an impact end 120 and an attachment end 180 of a crash attenuator 100, and is aligned with and defines an axial impact direction generally parallel to the arrow 2 indicating the direction of traffic flow in FIGS. 1, 2, 7, 10A, 10B and 11. The term "front," "forward," "forwardly," and variations thereof refer to the position or orientation relative to the attachment end 180, which connects the crash attenuator 100 to a maintenance vehicle 3 or the like, while the term "rear," "rearward," "rearwardly," and variations thereof refer to the position or orientation relative to the impact end 120 of the crash attenuator 100, which receives an impacting vehicle. The term "downstream" refers to the position or orientation moving away from the impact end 120 and toward the attachment end 180 of the crash attenuator 100, while the term "upstream" refers to the position or orientation moving toward the impact end 120 and away from the attachment end 180 of the crash attenuator 100. Therefore, for example, a component positioned downstream of another component is closer to the attachment end 180, and vice versa, a component positioned upstream of another component is closer to the impact end 120. The term "outboard" refers to the direction or orientation towards the outermost edges of the crash attenuator 100, while the term "inboard" refers to the direction or orientation away from the outermost edges and towards the center of the crash attenuator 100. The term "upper" refers to the vertical direction or orientation towards the top most edge of the crash attenuator 100, while the term "lower" refers to the vertical direction or orientation towards the ground.

Turning now to the drawings, FIGS. 1-6 illustrate a crash attenuator 100 incorporating preferred embodiments of this invention. Referring to FIG. 1, the crash attenuator 100 includes guide collar assemblies 110, an impact end 120, deflecting members 130, a suspension assembly 140, wheels 150, deforming collar assemblies 160, a cross-brace assembly 170, an attachment end 180, and two laterally spaced pairs of deformable attenuator members 190. The lower laterally spaced pair of deformable attenuator members 190 includes proximate ends 194 and distal ends 196, while the upper laterally spaced pair of deformable attenuator members 190 includes proximate ends 192 and distal ends 198. The attenuator members 190 are preferably long steel tubes having a 3 inch diameter circular cross section and 0.125 inch wall thickness. Of course, it should be understood that the attenuator members 190 may be made from other materials, such as aluminum, polymers, composites, or other suitable materials having wall thicknesses greater or less than 0.125 inches, as well as being configured with non-circular cross sectional shapes such as square, rectangular, octagonal, and the like.

Figure 2:
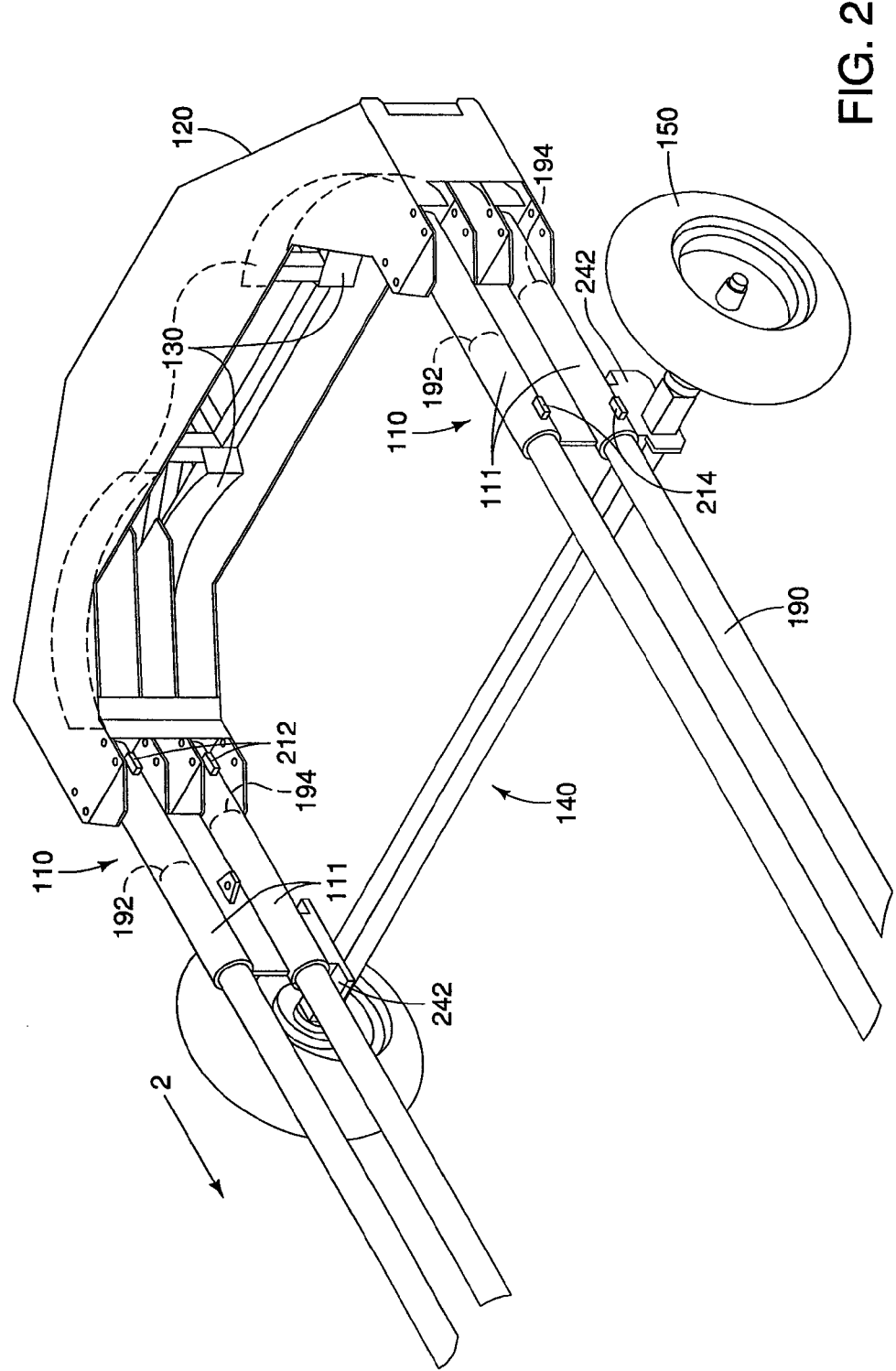
FIG. 2 is a close-up perspective view of an impact end of the attenuator shown in FIG. 1.

Referring to FIG. 2, the crash attenuator 100 further comprises axle anchor plates 242, inboard deforming members 212, and outboard deforming members 214. Preferably, the crash attenuator 100 includes two guide collar assemblies 110. Each guide collar assembly 110 includes two attenuator receivers 111. The attenuator receivers 111 include an inboard deforming member 212, and an outboard deforming member 214. A fastener hole 112 (shown in FIG. 6) is disposed on the inboard surface of each of the attenuator receivers 111.

Figure 3A:
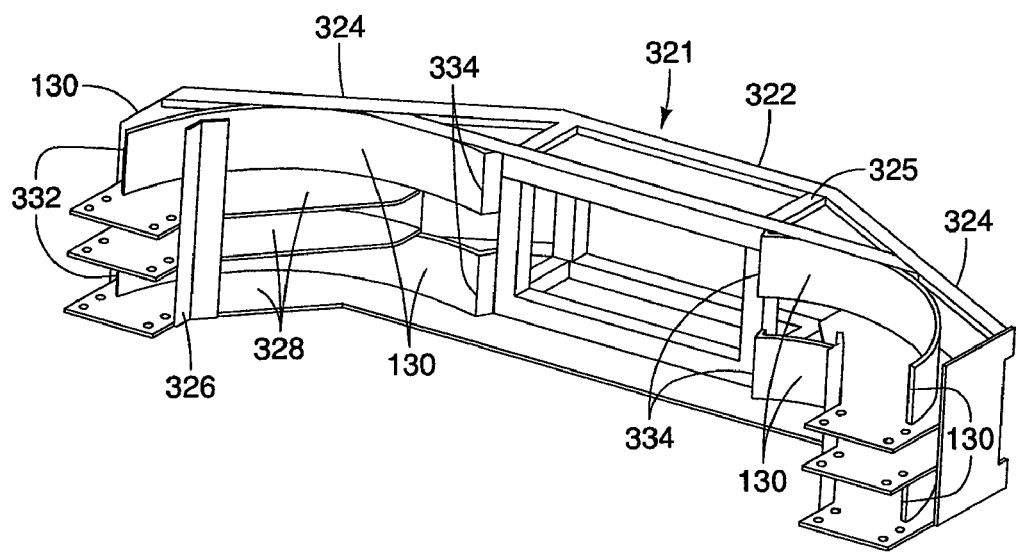
FIG. 3A is a partially exploded perspective view of an impact member shown as viewed from the hitch end of the attenuator shown in FIG. 1.
Figure 3B:
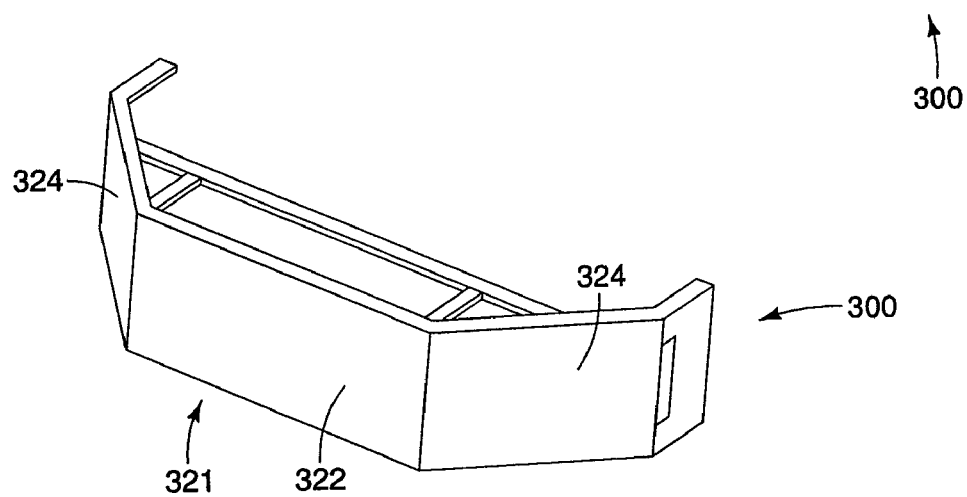
FIG. 3B is a partially exploded perspective view of the impact member shown in FIG. 3A, as viewed from the impact end of the attenuator shown in FIG. 1.

Referring to FIGS. 3A and 3B, the impact end 120 comprises an impact member 300 that is preferably 73.24 inches in width at its widest point. Of course it should be understood that the impact member 300 may be wider or narrower than 73.24 inches. The impact member 300 includes an impact surface 321 having a central portion 322 and side portions 324, a frame structure 325, inner attenuator guide members 326, and upper and lower attenuator guide members 328. The impact member 300 includes deflecting members 130. Each deflecting member includes an input end 332 and an output end 334. Preferably, the impact member 300 has four deflecting members, each deflecting member corresponding to and positioned to engage a deformable attenuator member 190.

Figure 4:
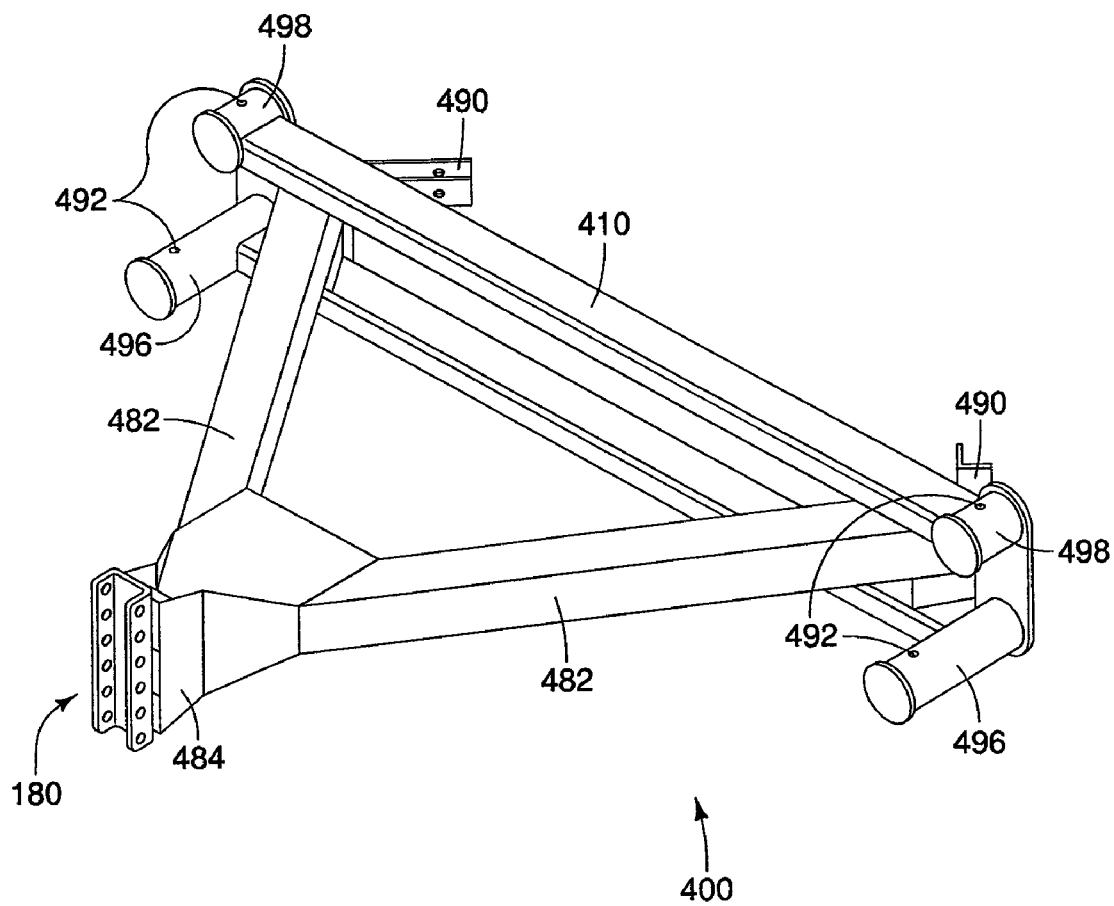
FIG. 4 is a partially exploded perspective view of the hitch end of the attenuator shown in FIG. 1.
Figure 5A:
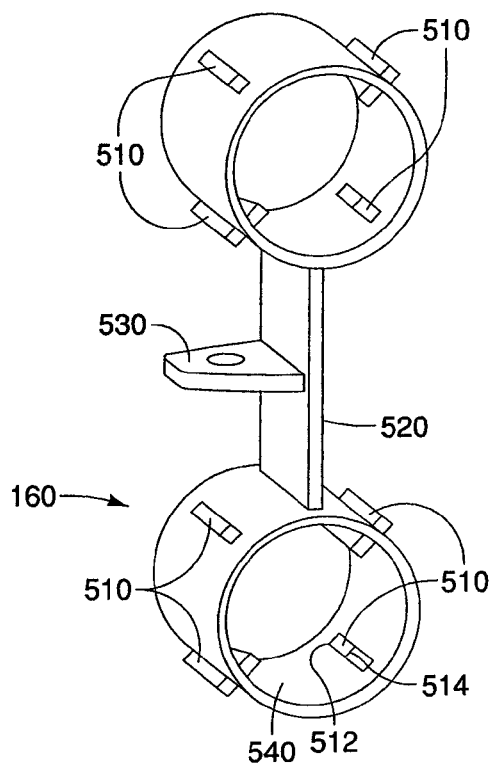
FIG. 5A is a perspective view of a downstream deforming structure as shown in FIG. 1.
Figure 5B:
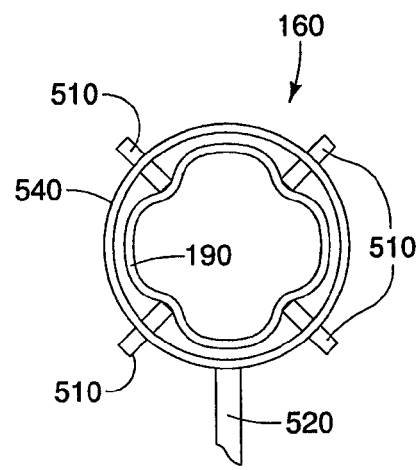
FIG. 5B is a front view of a portion of the downstream deforming assembly shown in FIG. 5A.
Figure 5C:
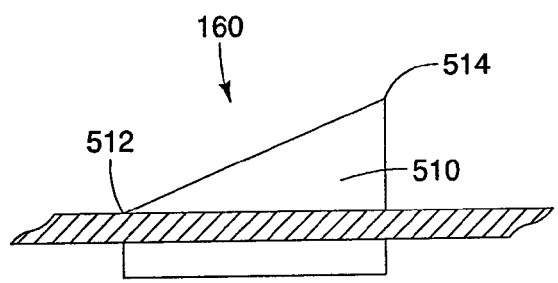
FIG. 5C is a side view of a deforming member shown in FIG. 5B.
Figure 5D:
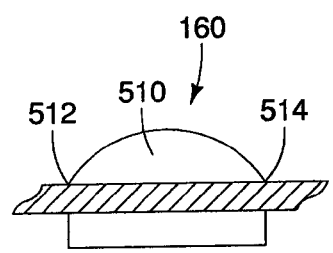
FIG. 5D is an alternative embodiment of the deforming member shown in FIG. 5C.

Referring to FIG. 4, the attachment end 180 of FIG. 1 comprises a vehicle attachment assembly 400. The vehicle attachment assembly 400 includes a vehicle hitch receiving member 484, deformable attachment member 482, upper attenuator member braces 498, and lower attenuator member braces 496. Each of the upper and lower attenuator member braces includes a through bolt hole 492. The vehicle attachment assembly 400 also includes two cross-brace attachment members 490, and a distal end support frame 410.

Referring to FIGS. 5A-5D, the deforming collar assemblies 160 of FIG. 1 comprise a plurality of deforming members 510, a connecting member 520, a cross-brace attachment member 530, and a receiving collar 540. The deforming member 510 includes a leading edge 512 and a trailing edge 514.

Figure 6:
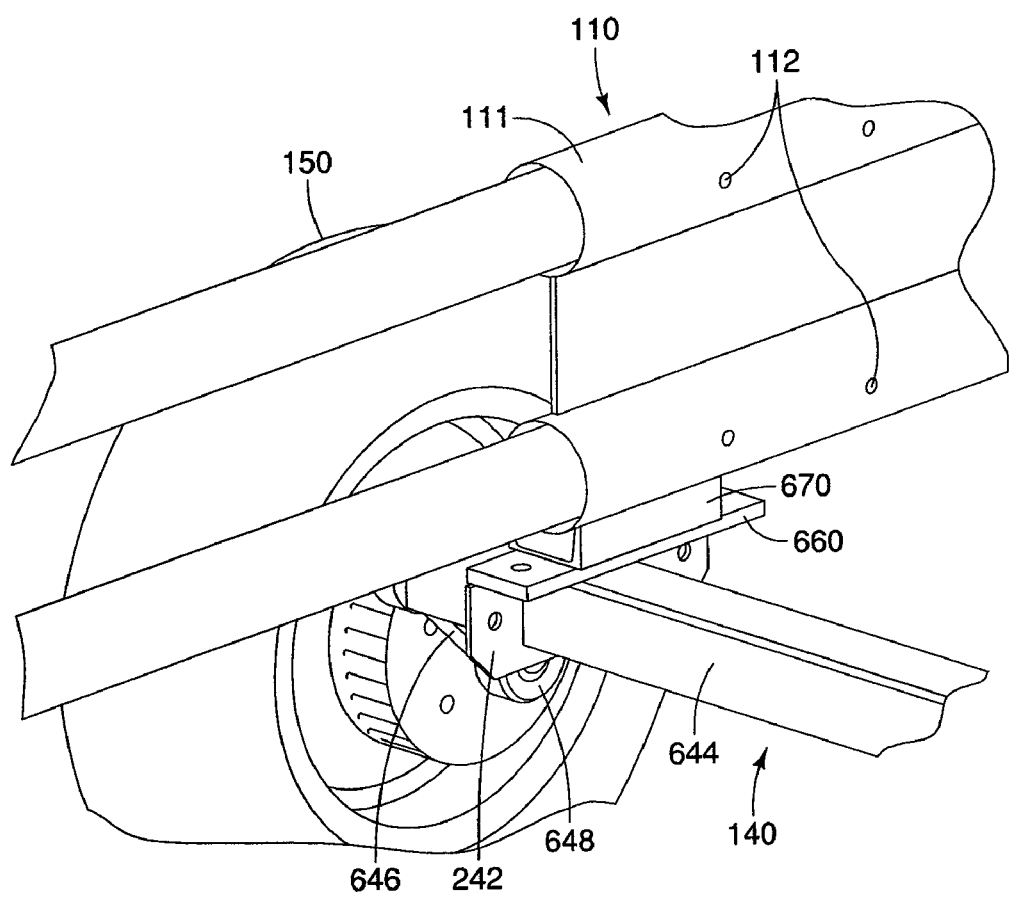
FIG. 6 is a close-up perspective view of the suspension assembly shown in FIG. 1.

Referring to FIG. 6, the suspension assembly 140 includes an integrated suspension axle 644, the axle anchor plate 242, a collar anchor plate 660, and a collar receiver channel 670. The suspension assembly 140 also includes a pair of wheel axles 648, and a pair of lever arms 646.

Referring to FIGS. 3A and B, the impact surface 321 is rigidly attached to the rearward most face of the impact member 300, and is wide enough to protect the maintenance vehicle 3 or the like towing the crash attenuator 100. The central portion 322 of the impact surface 321 lies substantially in a laterally extending vertical plane tangent to the rearward most surface of the frame structure 325. The central portion 322 is preferably 24 inches wide and is preferably positioned such that the horizontal center of the central portion 322 coincides with the horizontal center of the impact surface 321. Two side portions 324 of the impact surface 321 extend laterally outward from the outermost edges of the central portion 322, and extend longitudinally toward the attachment end 180 from the central portion 322 such that they form an acute angle, preferably 30 degrees, with the vertical plane when viewed from above. Of course it should be understood that the central portion 322 may be wider or narrower than 24 inches, and the side portions 324 may be positioned such that they form an acute angle with the vertical plane that is greater or less than 30 degrees.

The impact surface 321 is attached to the frame structure. The frame structure itself is comprised of a plurality of tubular members, preferably having a square cross section, that are preferably rigidly fixed to each other by welding. Of course it should be understood that the frame members may be solid or tubular members of any cross section, and can be fixed by chemical bonding, or mechanical connections such as bolts, screws or rivets as is known in the art.

In operation, the frame structure 325 acts as a lightweight, rigid support that resists deformation during impact, and provides reaction surfaces for the deflecting members 130 and the impact surface 321.

The deflecting members 130 are preferably a continuously curved ¼ inch thick metal plate having a 16 inch radius, although other curvatures would also be suitable, including various continuously curved, but non-circular surfaces. Of course it should be understood that the deflecting members may be metal plates having thicknesses greater or less than ¼ inch, and may also be made of materials other than metal, such as high density polymers, ceramics, or composites. Each of the deflecting members 130 are attached to the frame structure 325 at the input end 332 and the output end 334, but are preferably attached at multiple points along the rear surface to the frame structure 325 to provide a more supportive reaction surface for the deflecting members 130 during impact. The input end 332 of the deflecting members 130 are attached to the frame near the outboard edge of the frame structure 325, while the output end 334 of the deflecting members 130 is attached to the frame near the portion of the frame structure 325 supporting the central portion 322 of the impact surface 321. The output end preferably wraps around greater than 90 degrees, such that the output end is directed at least partially in a downstream direction.

The upper and lower attenuator guide members 328 are rigidly attached to the upper and lower edges of the deflecting members 130 as well as the frame structure 325. The inner attenuator guide members 326 are rigidly fixed to the innermost edge of the upper and lower attenuator guide members 328, such that the inner attenuator guide members 326 and the upper and lower attenuator guide members 328 form a guide channel that guides each of the deformable attenuator members 190 toward and along the curved surface of the deflecting members 130 when the impact surface is impacted by a vehicle.

Referring to FIG. 2, the guide collar assemblies 110 are rigidly connected to the impact end 120, preferably by a mechanical connection such as bolts, screws or rivets, or by welding or combinations thereof. Specifically, the guide collar assemblies 110 are rigidly attached to the upper and lower attenuator guide members 328. Of course, it should be understood that the guide collar assemblies 110 may also be rigidly attached by welding, bonding, or the like.

Each guide collar assembly includes at least one inboard deforming member 212 and one outboard deforming member 214, both of which are rigidly attached to each of the attenuator receivers 111. Both the inboard and outboard deforming members 212 and 214 are preferably inserted through slots cut into the attenuator receivers 111, and are thereafter fixedly secured thereto. The slots receiving the inboard deforming members 212 are disposed on the inboard side of the attenuator receivers 111 toward the rearward end of the attenuator receivers 111, and adjacent to the corresponding deflecting member 130. However, the inboard deforming member 212 preferably does not extend beyond the rearward most end of the attenuator receiver 111. The slots receiving the outboard deforming members 214 are disposed downstream of the inboard deforming members 212 on the outboard side of the attenuator receivers 111.

Both the inboard and outboard deforming members 212 and 214 are configured to be inserted through the slots such that the deforming members 212 and 214 at least minimally engage the deformable attenuator member 190 during impact. However, the degree of engagement between the inboard and outboard deforming members 212 and 214 may be tuned by increasing or decreasing the depth of insertion, or the amount of protrusion into the interior space of the deformable attenuator member. Of course, it should be understood that the inboard and outboard deforming member 212 and 214 may also be rigidly attached to the inside wall of the attenuator receivers 111, instead of inserted through a slot.

As shown in FIG. 6, the upper end of a collar receiving channel 670 is attached to the bottom of the guide collar assembly 110, while the bottom end of the collar receiving channel 670 is attached to the collar anchor plate 660. Each collar anchor plate 660 is rigidly secured to the axle anchor plate 242 using mechanical fasteners such as bolts, rivets, or the like, or by welding or combinations thereof. The axle anchor plate 242 is attached to the suspension assembly 140. More specifically, the axle anchor plate 242 is attached to the integrated suspension axle 644, preferably by welding, or with mechanical fasteners or combinations thereof. In one embodiment, the suspension axle 644 is a torsion/suspension axle assembly, such as a TorFlex® axle, which includes a rectangular main axle, and a pair of wheel axles 648 secured thereto with a pair of lever arms 646 that rotate against a biasing force created by a torsion spring. The wheels 150 are attached to the wheel axles 648. Of course, it should be understood that other axle configurations may be utilized, such as a rigid/straight axle, or other suspension axles, including for example, and without limitation, leaf or compression springs with dampening systems.

The wheels of the suspension assembly 140 are positioned near the impact end 120 to support the weight of impact member 300, and prevent excessive gyration/vibration/displacement while the crash attenuator 100 is being towed by a maintenance vehicle 3 or the like.

As shown in FIGS. 1 and 2, the crash attenuator 100 preferably includes two pairs of deformable attenuator members 190 having equal lengths. In order to maximize lateral stability during impact, each pair of the deformable attenuator members 190 are spaced apart laterally such that the deformable attenuator members 190 are disposed at the outboard edges of the impact member 300. The two pairs of laterally spaced deformable attenuator members 190 are also vertically spaced apart to increase stability. In a preferred embodiment, the two pairs of deformable attenuator members 190 are vertically spaced such that the vertical center of the combined deformable attenuator bending resistance is placed approximately midway between the center of gravities of a small car fulfilling the 820C requirements of the NCHRP 350 test criteria, and a large vehicle fulfilling the 2000P requirements of the NCHRP 350 test criteria. Of course, it should be understood that the deformable attenuator members 190 may be spaced laterally or vertically at any distance within the crash attenuator 100.

Referring to FIG. 6, a threaded attachment member (not shown), such as a riv nut or weldnut, is attached near the proximate ends 192 and 194 of the deformable attenuator members 190. The threaded attachment member is preferably attached at the same distance from the proximate ends 192 for the upper laterally spaced pair of deformable attenuator members 190 and the proximate ends 194 for the lower laterally spaced pair of deformable attenuator members 190. The proximate ends 192 and 194 of the deformable attenuator members 190 are partially inserted into the downstream end of the attenuator receivers 111. Each of the deformable attenuator members 190 are attached to the guide collar assemblies by a single threaded fastener, that is of sufficiently low strength to shear off upon impact with a vehicle. The threaded fastener is inserted through the fastener hole 112 and threads into the threaded attachment member thereby securing the deformable attenuator members 190 to the guide collar assemblies 110. The threaded fasteners preferably have a diameter of ⅜ inches and are made of SAE J429 Grade 5 steel, but are not limited thereto. When attached to the guide collar assemblies 110, the proximate ends 192 and 194 do not contact the deflection members 130, and preferably do not extend past the rearward most ends of the attenuator receivers 111 prior to impact, but rather are spaced downstream from the impact surfaces of the deflection members.

In one embodiment, the proximate ends 192 of the upper pair of laterally spaced deformable attenuator members 190 and the proximate ends 194 of the lower pair of laterally spaced deformable attenuator members 190 are spaced downstream from the input end 332 of the deflecting members 130 at different distances, such that the proximate ends 192 are spaced downstream of the proximate ends 194. In this embodiment, the fastener holes 112 of the attenuator receivers 111 are spaced such that the fastener hole 112 corresponding to the threaded attachment member attached near the proximate end 192 is disposed downstream of the fastener hole 112 corresponding to the threaded attachment member attached near the proximate end 194.

In an alternative embodiment, the proximate ends 194 may be spaced downstream of the proximate ends 192 with the corresponding fastener holes 112 spaced accordingly. In yet another alternative embodiment, as viewed from the impact end 120 in the direction of traffic flow 2, the left proximate end 192 may be spaced downstream of the right proximate end 192 of the upper pair of deformable attenuator members 190 and vice versa the right proximate end 192 may be spaced downstream of the left proximate end 192. Additionally, the right proximate end 194 may be spaced downstream of the left proximate end 194 of the lower pair of deformable attenuator members 190, and vice versa, the left proximate end 194 may be spaced downstream of the right proximate end 194. Of course it should be understood that any combination of offset spacing of the proximate ends 192 and 194 of the upper and lower deformable attenuator members 190 described above is possible.

This staggered fastener hole spacing simplifies manufacturing and reduces costs because four identically sized deformable attenuator members 190 having identical placement of the threaded attachment members relative to the proximate ends 192 and 194 can be used to achieve the staggered spacing configuration between the upper and lower pairs of deformable attenuator members 190. Of course, it should be understood that the staggered configuration of deformable attenuator members 190 can be achieved by spacing the proximate ends 194 downstream of the proximate ends 192, spacing one of the proximate ends 192 downstream of the other proximate end 192, or using deformable attenuator members 190 of different lengths.

Referring to FIG. 4, the distal ends 198 and 196 of the upper and lower pairs of deformable attenuator members 190 extend longitudinally from the attenuator receivers 111 of the guide collar assembly 110 to the attachment end 180, and include vertical anchor holes (not shown). Specifically, the distal ends 198 and 196 terminate at and are rigidly attached to the attenuator member braces 496 and 498. The attenuator member braces 496 and 498, shown in FIG. 4, are disposed around the distal ends 198 and 196, and include through bolt holes 492. Preferably, the deformable attenuator members 190 are attached to the attenuator braces 496 and 498 by inserting a ½ inch or similar bolt or connecting pin through the bolt holes 492 and the vertical anchor holes in the deformable attenuator members 190.

The distal end support frame 410, which spans the lateral and vertical distances between the attenuator braces 496 and 498, is attached to the attenuator braces 496 and 498. The rearward end of the two deformable attachment members 482 are rigidly attached near the outboard edges of the forward face of the distal end support frame 410, and extend inwardly downstream where they are attached to the vehicle hitch receiving member 484. The vehicle hitch receiving member 484 is configured to releasably secure the crash attenuator 100 to a maintenance vehicle 3 or the like. Preferably, the vehicle hitch receiving member is configured to be releasably rotatably secured to a maintenance vehicle's 3 towing hitch, and may include for example a component (not shown) adapted to engage a pintle hook or like coupling device.

Two cross-brace attachment members 490 are rigidly attached to the outboard edges of the rearward face of the distal end support frame 410, and extend inwardly upstream. The forward most end of a cross brace member 174 is attached to each of the cross-brace attachment members 490, while the rearward most end of the cross brace member 174 is attached to the attachment member 530 of the deforming collar assembly 160. The cross brace members 174 are preferably attached to the attachment member 530 with a bolt, or other mechanical fastener, or by welding or combinations thereof.

Referring to FIG. 5, each deforming collar assembly 160 is disposed around a pair of vertically spaced deformable attenuator members 190. The deforming collar assembly 160 includes two receiving collars 540. Each receiving collar 540 is disposed around the outer surface of one of the pair of vertically spaced deformable attenuator members 190. The upper and lower receiving collars 520 are connected by and fixedly attached to the connecting member 520. Each deforming collar assembly 160 also includes a plurality of deforming members 510 configured to engage the deformable attenuator members 190.

The deforming collar assemblies 160 preferably include four deforming members 510 disposed along axes neutral to the bending moment resulting from the deformation of the deformable attenuator members 190 during impact. Each deforming member 510 has a leading edge 512 disposed upstream from the trailing edge 514. The portion of the deforming member 510 that engages the deformable attenuator member 190 is preferably formed in a ramp or semicircular shape, as shown in FIGS. SC and 5D. The deforming members 510 are rigidly attached to the receiving collars 540, and are preferably inserted through slots cut into the receiving collars 540. The degree of engagement between the inboard and outboard deforming members 510 may be tuned by increasing or decreasing the depth of insertion of the deforming members 510 into the receiving collars 540. The two deforming collar assemblies are connected by a lateral brace bar 172, which helps prevent the deformable attenuator members 190 from buckling in the horizontal plane during impact. In one embodiment, only an upper and lower deforming member are attached to the receiving collar, with the deforming members being vertically aligned along a neutral bending axis of the deformable member such that the deformation of the deformable members by the deforming members does not significantly modify the bending characteristics (moment of inertia) of the deformable member.

In operation, the crash attenuator 100 is attached to a receiver hitch located at the front or rear of a maintenance vehicle 3 or the like by the vehicle hitch receiving member 484. This configuration allows the crash attenuator 100 to be towed and rotated similar to a standard trailer assembly. The attenuator braces 496 and 498 operate to restrain the distal ends of the deformable attenuator members 190 in impact. The crash attenuator 100 is configured to attenuate crash energy from vehicles traveling in the direction of traffic flow 2 that impact the impact member 300 in an axial or offset direction.

In the event of an axial impact, the impacting vehicle primarily contacts the central portion 322 of the impact surface 321. In an offset impact the vehicle primarily loads only one side of the central portion 322 of the impact surface 321, but does not significantly load the corresponding side portion 324. Because the side portion 324 is angled toward the attachment end 180, offset impacts load the impact member 300 more evenly, which reduces the eccentric effect on the crash attenuator 100 and therefore results in a reduced bending moment applied to the deformable attenuator members 190.

When a vehicle impacts the impact member 300, the impact forces the impact surface 321 against the frame structure 325 and accelerates the entire impact end 120 and all the components rigidly attached thereto, including the impact member 300, the guide collar assemblies 110, and the suspension assembly 140 in a longitudinal direction toward the attachment end 180.

The wheels, which are engaged with the ground, help guide the crash cushion in the longitudinal direction 2 during impact. Furthermore, because the suspension assembly 140 is rigidly connected to the impact member 300 through the guide collar assemblies 110, the suspension assembly 140 helps prevent the impact member 300 from being deflected downward during impact.

As the impact end 120 moves longitudinally toward the attachment end 180, the threaded fasteners connecting the deformable attenuator members 190 to the guide collar assemblies 110 are sheared off by the attenuator receiver 111, thereby decoupling the deformable attenuator members 190 from the attenuator receivers 111. Of course it should be understood that the threaded fasteners may be decoupled by means other than shearing, such as ejecting the threaded fastener. The impact end 120 then moves along the deformable attenuator members 190, which are connected to the maintenance vehicle 3 by the attachment end 180, and thus remain stationary.

Once the attenuator receivers 111 have become decoupled from the deformable attenuator members 190, the attenuator receivers 111 move along the deformable attenuator member 190 as the impact member 300 is forced towards the attachment end 180 by the impacting vehicle. As the attenuator receivers 111 move along the deformable attenuator members 190, the inboard and outboard deforming members 212 and 214 engage the deformable attenuator member 190, which has a stabilizing effect on the deformable attenuator members 190. In the event the impact member 300 rotates due to the impact force, for example in the event of an offset impact, the inboard and outboard deforming members 212 and 214 are configured to engage the deformable attenuator member 190 on the side of the offset impact. This engagement introduces a corresponding deforming force in the deformable attenuator member 190 closest in proximity to the rotational moment source, without increasing force in the other deformable attenuator members 190. As such, the impact member tends to move uniformly along both sets of deformable attenuator members. During this initial stage of impact, the deformable attenuator members 190 are spaced away from the deflecting member 130 and the decelerating force exerted on the vehicle by the crash attenuator 300 is substantially limited to the acceleration of the mass of the impact end 120, including the suspension assembly 140 and impact member 300. Thus, the vehicle and its occupants are subjected to an acceptable delta V, as specified in the NCHRP 350 specification.

As the attenuator receivers 111 continue to move longitudinally downstream, the proximate ends 194 of the deformable attenuator members 190, which are spaced closest to the deflecting members 130 move along the upper and lower attenuator guide members 326 and contact the input end 332 of the continuously curved surface of the deflecting member 130. As the proximate ends 194 of the deformable attenuator members 190 move along the surface of the deflecting member 130, the lower pair of deformable attenuator members 190 is bent inwardly, thereby absorbing energy. Preferably, the bending forces cause the deformable attenuator members 190 to kink at set intervals, which produces a continuous curling affect as the attenuator receivers 111 move longitudinally downstream towards the attachment end 180. Each time a deformable attenuator member 190 kinks, it results in a spike in energy absorption, which results in a spike in ridedown g for the impacting vehicle and its occupants. In one embodiment, the deformable attenuator members kink at 12 inch intervals, with the ends of the deformable members being longitudinally staggered or offset from each other at a distance of 6 inches.

Shortly after the proximate ends 194 of the lower pair of deformable attenuator members 190 contact the deflecting member 130, the proximate ends 192 of the upper pair of deformable attenuator members 190 contact the deflecting member 130. The upper pair of deformable attenuator members 190 is bent inwardly in the same manner described above with regard to the lower pair of deformable attenuator members 190. Because the deformable attenuators 190 kink at set intervals, by staggering the spacing of the proximate ends 192 and 194 from the deflecting member 130 only two deformable attenuator members 190 will kink at any given time. Therefore, in this staggered configuration the vehicle and its occupants will only experience a decelerating force equal to the energy absorbed by kinking one pair of deformable attenuator members 190 at any given time. Of course it should be understood that the positioning of the proximate ends 192 and 194 is not limited to the staggered configuration described above and any configuration of the left and right proximate ends 192 and 194 of the upper and lower pairs of deformable attenuator members 190 such that two of the proximate ends 192 or 194 are spaced downstream from the remaining two proximate ends 192 or 194 may be used.

In operation, the cross-brace assembly 170 is configured to increase the lateral rigidity of the crash attenuator 100 and prevent inboard or outboard buckling due to the bending moment exerted on the deformable attenuator members 190 during bending. The cross-brace assembly 170 also reduces the effective length of the deformable attenuator members 190 thereby reducing the tendency to buckle due to a compression load as the deformable attenuator members 190 are deformed during impact.

In the case of a small vehicle impact, the impacting vehicle is decelerated within the NCHRP 350 specification limits prior to the impact end 120 contacting the cross-brace assembly 170. Thus, the cross-brace assembly 170 is not configured to deform under a small vehicle impact. However, the cross-brace assembly 170 is configured to deform under an axial or offset impact by a large vehicle.

When a large vehicle fulfilling the 2000P requirements of the NCHRP 350 test criteria impacts the crash attenuator 100, the initial stages of crash attenuation and energy absorption are identical to those described above. However, during a large vehicle impact, the forward most end of the attenuator receivers 111 contact the rearward most face of the receiving collar 540 and with enough force to accelerate the cross-brace assembly 170 toward the attachment end 180. This in turn causes the leading edge 512 of the deforming members 510 to engage the deformable attenuator members 190. As the attenuator receivers 111 continue to move longitudinally downstream, the deformable attenuator members 190 are increasingly deformed as the outer surface of the deformable attenuator members 190 travels along the surface of the deforming members 510 from the shallow leading edge 512 to the deeper trailing edge 514. Because the deforming collar assemblies 160 are rigidly connected to the cross-brace members 174, the cross-brace members 174 are also configured to deform as the deforming collar assemblies 160 are forced downstream toward the attachment end 180.

The deformable attachment members 482 of the attachment end 180 are configured to remain rigid during both small and large vehicle axial impacts. However, during an offset large vehicle impact, the deformable attachment members 482 are configured to deform, preferably in an upward direction. This deformation of the deformable attachment members 482 causes the vehicle attachment assembly 400 to hinge about the hitch mount of the maintenance vehicle 3, and allows the crash attenuator 100 to pivot away from the vehicle and direct the impacting vehicle away from the maintenance vehicle 3.

Figure 7:
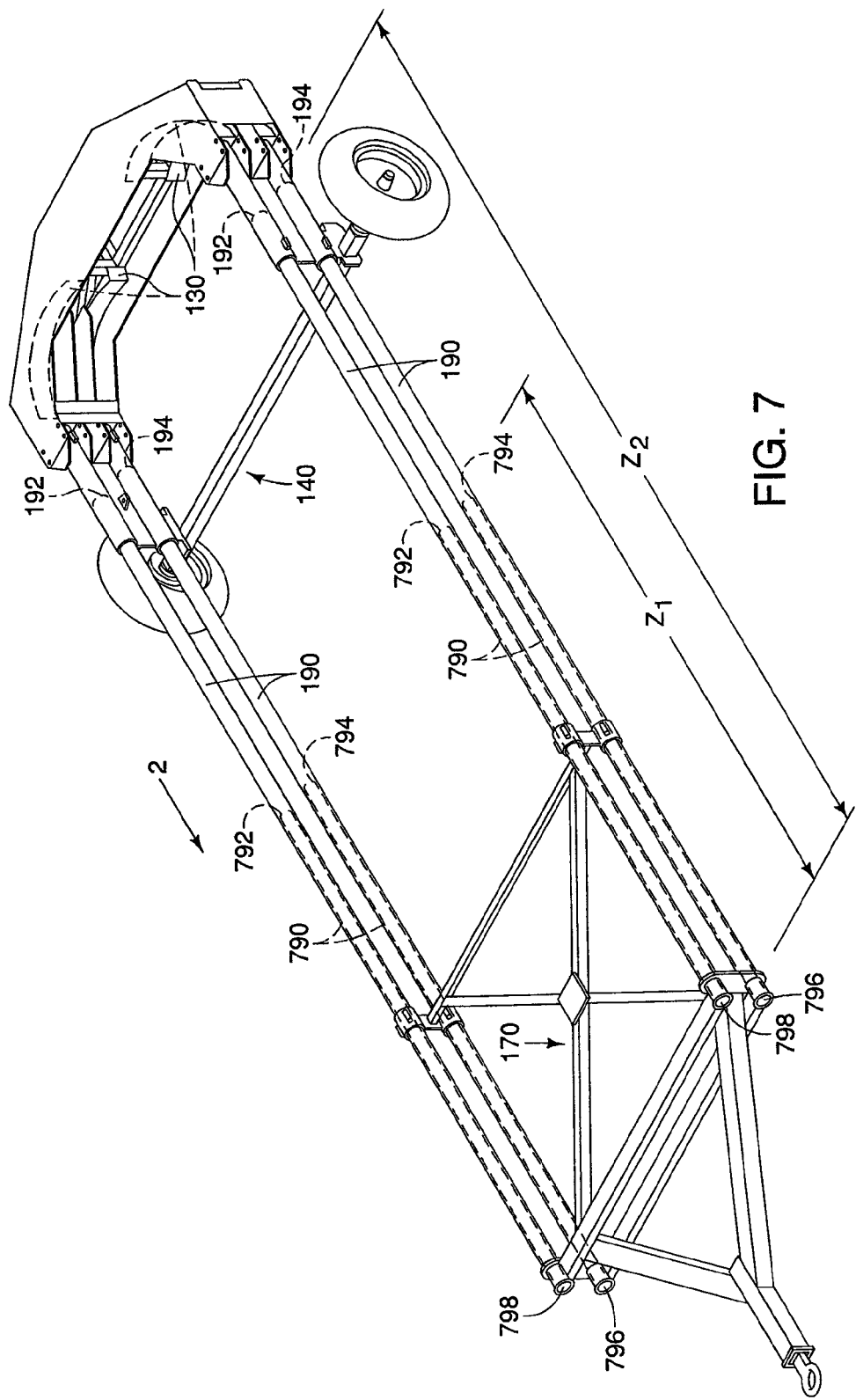
FIG. 7 is a perspective view of the attenuator shown in FIG. 1 before impact with a vehicle.

FIG. 7 illustrates an alternative embodiment of the crash attenuator 100 that further comprises secondary deformable attenuator members disposed within the deformable attenuator members 190. The secondary deformable attenuator members 790 are deformable members having an outer diameter that is small enough to fit inside the deformable attenuator members 190. Preferably, the secondary deformable attenuator members 790 are metal tubes having a circular cross section and an outer diameter that is a predetermined amount less than the inner diameter of the deformable attenuator members 190. Of course, it should be understood that the secondary deformable attenuator members 790 may be solid or hollow structures, and may be made of metal, polymers, composites, or other suitable energy absorbing materials.

The secondary deformable attenuator members have proximate ends 792 and 794 and distal ends 796 and 798. The proximate ends 792 and 794 of the secondary deformable attenuator members 790 are inserted at the distal ends 196 and 198 of the deformable attenuator members 190, and may be evenly spaced, or staggered to mirror the ridedown g spikes in a manner that is consistent with the deformable attenuator members 190. The secondary deformable attenuator members 790 are preferably shorter in length than the deformable attenuator members 190. The distal ends 796 and 798 of the secondary deformable attenuator members 790 are coupled to the distal ends of the deformable attenuator members 196 and 198. Thus in this alternative embodiment of the crash attenuator 100, the deformable attenuator members 190 include a secondary deformable attenuator member 790 disposed within and extending partially down the longitudinal length of the deformable attenuator members 190.

Preferably, each of the secondary attenuator members 790 are the same length, and thus extend down the deformable attenuator members 190 an equal distance. The portion of the deformable attenuator members 190 extending past the proximate ends 792 and 794 of the secondary deformable attenuator members 790, defines a first energy absorption zone (Z1), while the portion of the deformable attenuator members 190 extending from the distal ends 798 and 796 to the proximate ends 792 and 794 of the secondary deformable attenuator members 790 defines a second energy absorption zone (Z2), which absorbs more energy than the first energy zone (Z1).

In operation, the alternative embodiment absorbs energy through the same bending and deforming mechanisms described above with regard to the crash attenuator 100 of FIG. 1. However, when the proximate ends 792 and 794 contact the input end 332 of the continuously curved surface of the deflector member 130, the total energy absorption of the crash attenuator 100 is increased by the additional energy required to bend the secondary deformable attenuator members 790 disposed within the deformable attenuator members 190. Additional energy is absorbed in like fashion when the attenuator receivers 111 contact the deforming collar assemblies 160 and cause the leading edge 512 of the deforming members 510 to engage the deformable attenuator member 190 to the extent deforming members 510 also deform the secondary deformable attenuator members 790.

Figure 8A:
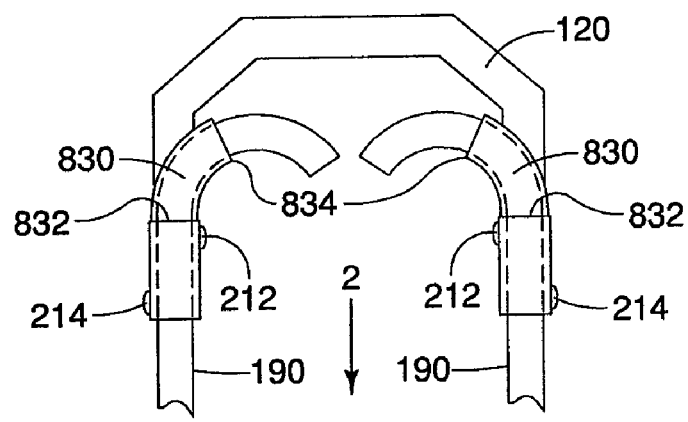
FIG. 8A is a top view of an alternative embodiment of a deflector member.
Figure 8B:
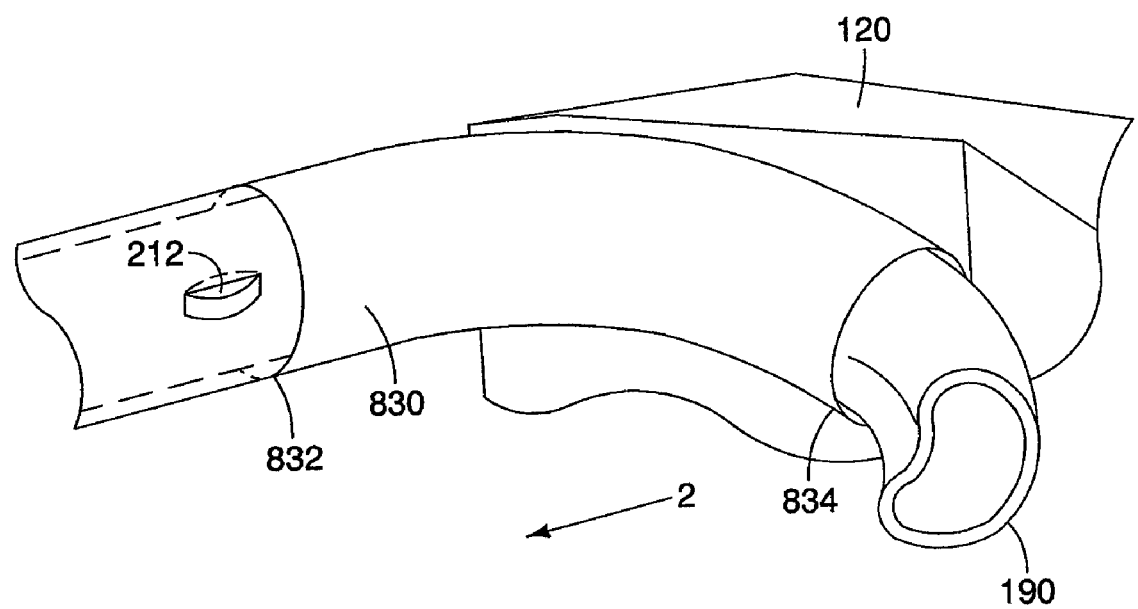
FIG. 8B is a close-up perspective view of the alternative embodiment of the deflector member shown in FIG. 8A.

FIGS. 8A-9C illustrate alternative embodiments of the deflecting member 130. FIG. 8A illustrates a top view of a bending pipe 830, and FIG. 8B illustrates a perspective view of the bending pipe 830. In FIGS. 8A-8B, the deflecting member is a bending pipe 830 having a continuously curved radius and an inner diameter larger than the outer diameter of the deformable attenuator members 190. The bending pipe 830 has an inlet end 832 and an outlet end 834 that bends inward toward the center of the crash attenuator.

When the deformable attenuator member 190 is forced through the bending pipe 830, the outer surface of the deformable attenuator member contacts the inlet end 832 marking the beginning of the inward bend. As the deformable attenuator member 190 is forced through the bending pipe 830, the deformable attenuator members 190 deform along the inside surface of the bending pipe and exit at the outlet end 834 of the bending pipe 830. Because the deformable attenuator member 190 is forced to follow the continuously curved radius of the bending pipe 830, the deformable attenuator member emerges from the bending pipe 830 having a radius substantially equivalent to the radius of the bending pipe 830. The outlet end can extend greater than 90 degrees such that it is at least partially directed downstream.

Figure 9A:
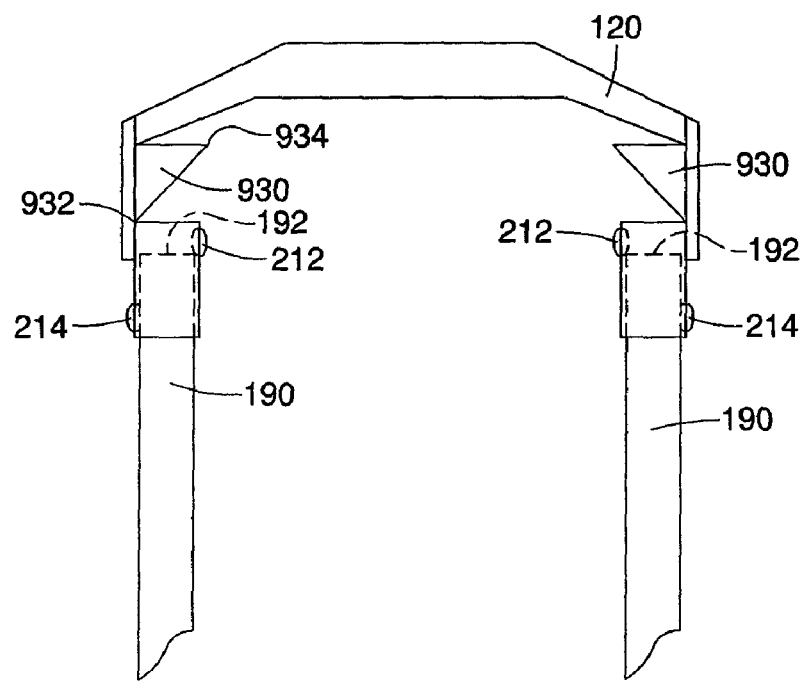
FIG. 9A is a top view of a second alternative embodiment of a deflector member before impact.
Figure 9B:
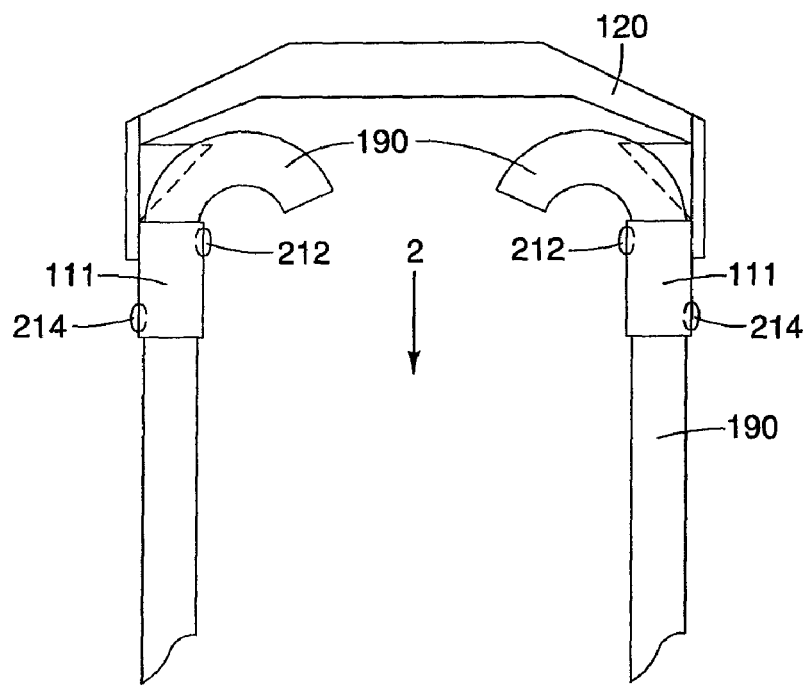
FIG. 9B is a top view of the second alternative embodiment of the deflector member shown in FIG. 9A after impact.
Figure 9C:
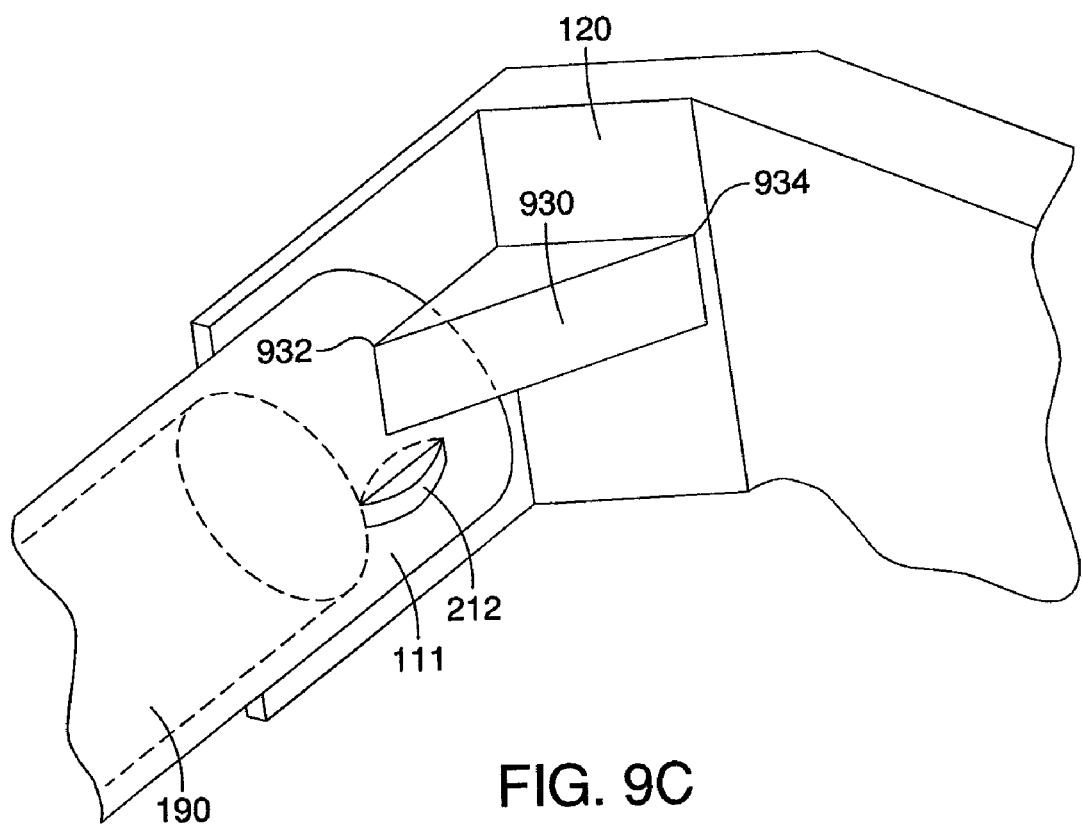
FIG. 9C is a partial perspective view of the second alternative embodiment of the deflector member shown in FIG. 9B before impact.

FIG. 9A illustrates a top view of a deforming deflecting member 930 prior to impact. FIG. 9B illustrates a top view of the deforming deflecting member 930 after impact. FIG. 9C illustrates a perspective view of the deforming deflecting member 930 prior to impact. The deforming deflecting member 930 includes an input end and an output end that are connected by a straight linear face creating an obtuse angle with the longitudinal axis of the deformable attenuator member 190. The straight deflecting face 910 of the deforming deflecting member 930 has a height that is less than the diameter of the deformable attenuator member 190 and is positioned such that the vertical center of the deflecting face 910 is in line with the central axis of the deformable attenuator member 190.

When the deformable attenuator member 190 is forced against the input edge 932 of the deforming deflecting member 930, the outer surface of the deformable attenuator member 190 contacts the straight deflecting face 910 and causes the deformable attenuator member 190 to deform inwardly and thereby absorb energy.

Figure 10A:
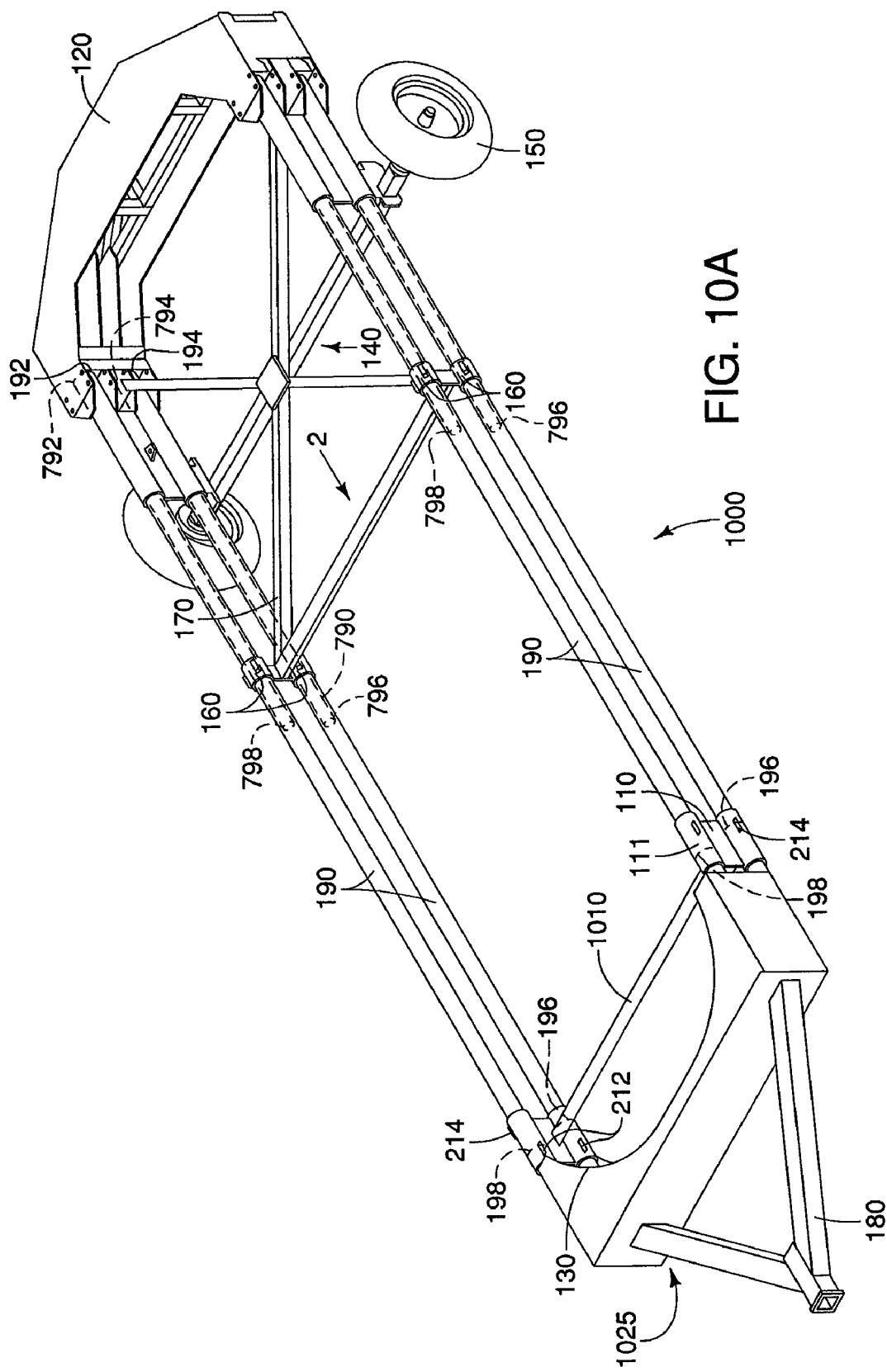
FIG. 10A is a perspective view of an alternative embodiment of a crash attenuator.
Figure 10B:
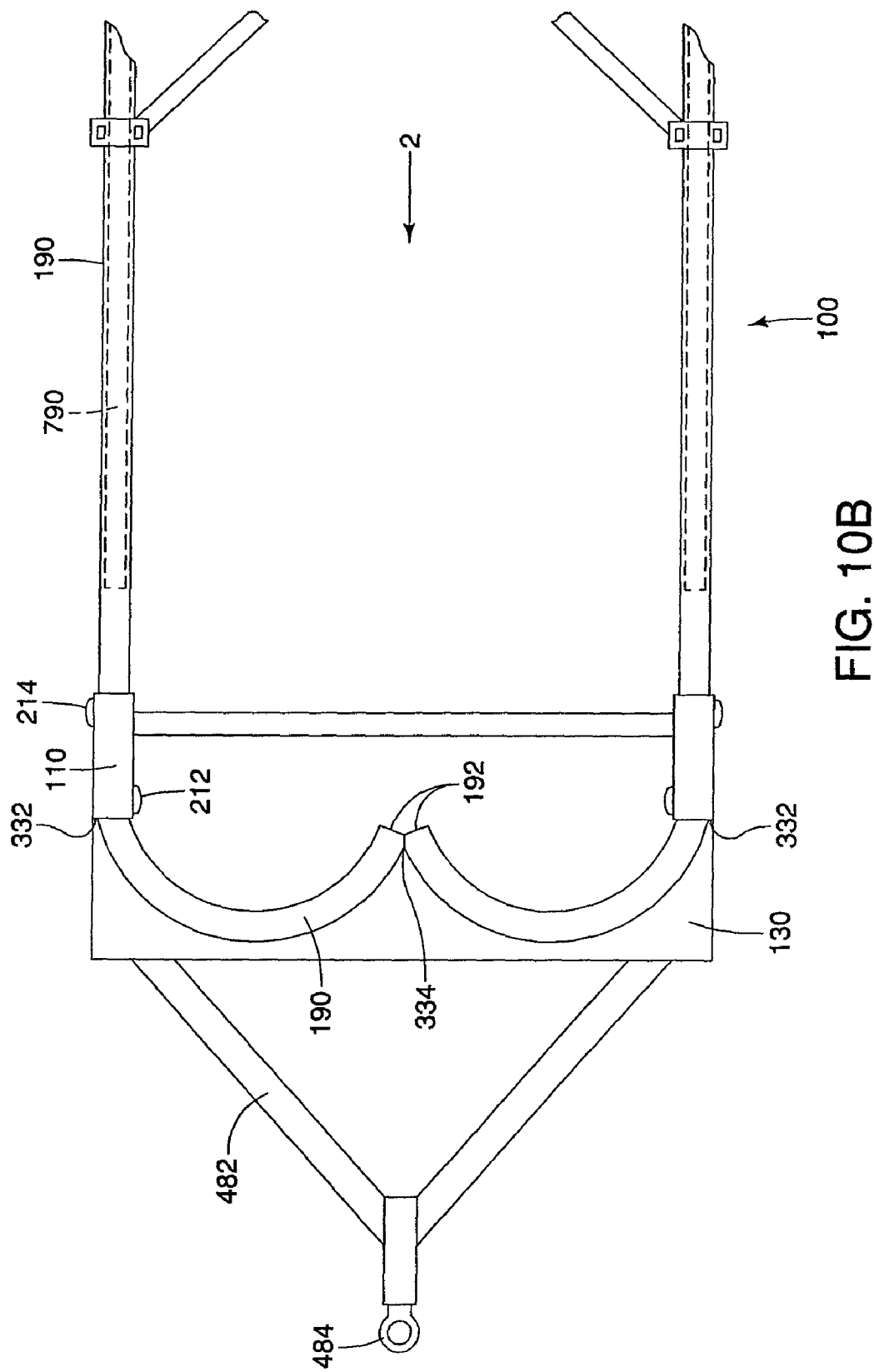
FIG. 10B is a top view of the alternative embodiment of the crash attenuator shown in FIG. 9A.

FIGS. 10A and 10B illustrate another alternative embodiment of the crash attenuator 100. The crash attenuator 1000 includes essentially the same elements as the crash attenuator 100 but arranged in a flip-flopped configuration with the proximate ends 192 and 194 of the deformable attenuator members 190 rigidly attached to the impact end 120, and the deflecting members 130 rigidly attached to the attachment end 180.

In the crash attenuator 1000, when a vehicle impacts the impact end 120, it accelerates the mass of the impact end 120, and all the components rigidly attached thereto, including the deformable attenuators 190, the cross brace assembly 170, and the suspension assembly 140. The distal ends 196 and 198 of the deformable attenuator members 190 are spaced longitudinally upstream from the deflecting members 130 in the pre-impact position. Preferably, the distal ends of the upper and lower laterally spaced deformable attenuator members 190 are staggered upstream from the deflecting members 130, as described above with regard to FIGS. 1-6. The guide collar assemblies 110, including the attenuator receivers 111 and inboard and outboard deforming members 212 and 214 are rigidly attached to an attachment end frame assembly 1025. A lateral brace 1010 extends laterally between and connects the two guide collar assemblies 110 and helps prevent inboard and outboard buckling during impact.

As the impact end 120 moves downstream toward the attachment end 180, the distal ends 196 and 198 of the deformable attenuator members 190 engage the inboard and outboard deforming members 212 and 214 of the guide collar assemblies 110, which are attached to an attachment end frame assembly 1025. The distal ends 196 and 198 then contact the input end 332 of the deflecting members 130 and travel along the continuously curved surface to the output end 334, which causes the deformable attenuator members 190 to bend inward.

During a large vehicle impact, the impact end 120 forces the forward end of the deforming collar assemblies 160 against the rearward end of the attenuator receivers 111, which causes the deforming members 510 to engage the deformable attenuator members 190.

Alternatively, the crash attenuator 1000 may also incorporate secondary deformable attenuator members 790 disposed within the deformable attenuator members 190 as described above with regard to FIG. 7. In this configuration, the proximate ends 792 and 794 are coupled to the proximate ends 192 and 194, and extend partially down the length of the deformable attenuator members 190 in a longitudinally downstream direction toward the attachment end 180. As the impact end 120 moves toward the attachment end 180 the secondary deformable attenuator members are deformed as described above with regard to FIG. 7

Figure 11:
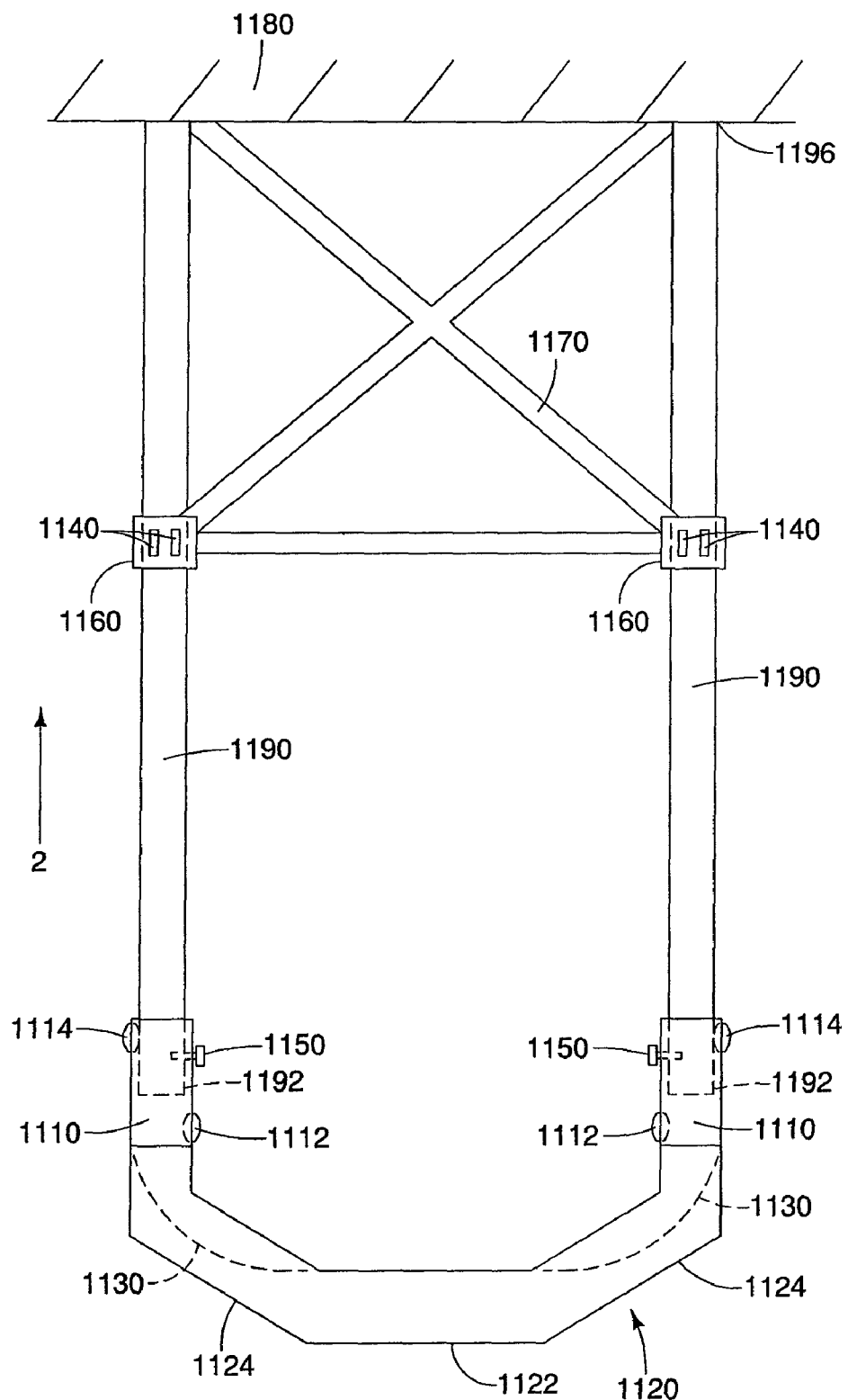
FIG. 11 is a top view of a fixed crash attenuator.

FIG. 11 illustrates a fixed anchor embodiment of a crash attenuator. The crash attenuator 1100 includes an impact member 1120, deflecting members 1130, attenuator receivers 1110, a cross brace assembly 1170, deforming collar assemblies 1160, and deformable attenuator members 1190 having distal ends 1196 and proximate ends 1192 that are spaced longitudinally downstream of the deflecting members 1130. The impact member includes a central portion 1122 and two side portions 1124 adjacent to the central portion 1122 and extending longitudinally toward the distal end 1196 of the deformable attenuator members 1190, such that the side portions 1124 are not parallel with the central portion 1122. The deforming collar assemblies include deforming members 1140. Each attenuator receiver 1110 includes an inboard deforming member 1112 and an outboard deforming member 1114.

The impact member 1120 is rigidly attached to the deflecting member 1130 and the attenuator receivers 1110. The distal ends 1196 of the deformable attenuator members 1190 are rigidly attached to an anchor surface 1180, such as a wall, or other immovable object secured to the ground, or the rear end of a stationary support vehicle. The proximate ends 1192 of the deformable attenuator members 1190 are attached to the attenuator receivers 1110 with a shearable fastener 1150. The front ends of the cross brace assembly 1170 are attached to the anchor surface 1180 near the distal end 1196 of the deformable attenuator members 1190, while the rear ends of the cross brace assembly 1170 are attached to deforming collar assemblies 1160 disposed around the deformable attenuator members 1190. The deforming members 1140 are attached to the deforming collar assemblies 1160, and are configured to engage the deformable attenuator member 1190 during impact.

When a vehicle contacts the impact member 1120, the impact member 1120 is accelerated toward the anchor surface 1180. This movement forces the shearable fastener 1150 to shear off, and allows the inboard and outboard deforming members 1112 and 1114 to engage the deformable attenuator members 1190. As the impact member 1120 travels toward the anchor surface 1180, the proximate ends 1192 of the deformable attenuator members 1190 contact the deflecting member 1130. The deformable attenuator members 1190 are then bent inward as the proximate ends 1192 are forced along the continuously curved surface of the deflecting members 1130.

As the forward surface of the attenuator receiver 1110 contacts the rearward surface of the deforming collar assemblies 1160, the deforming collar assemblies are forced downstream toward the anchor surface 1180, which causes the deforming members 1140 to engage the deformable attenuator members 1190.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A crash cushion comprising:
  a first end;
  an impact member movably located at a second end and longitudinally spaced from said first end, said impact member comprising at least one deflecting member having an input portion and an output portion;
  an energy absorbing member disposed between said second end and said first end, and configured to absorb energy when said impact member is moved from a pre-impact position to an impact position located toward said first end, said energy absorbing member comprising at least one deformable attenuator member extending in a longitudinal direction, wherein said deformable attenuator member moves along said at least one deflecting member from said input portion to said output portion as said impact member is moved from said pre-impact position to said impact position; and
  an impact surface located on said impact member, wherein said impact surface comprises a substantially central portion lying substantially in a laterally extending vertical plane, and opposite side portions extending laterally outward and longitudinally toward said first end from said central portion such that each of said side portions is non-parallel to said vertical plane; wherein said deflecting member comprises a continuously smoothly curved surface configured to engage said deformable attenuator member when said impact member is moved from said pre-impact position to said impact position.

2. The crash cushion of claim 1, further comprising a suspension member rigidly connected to said impact member, wherein said suspension member comprises a wheel configured to engage the ground.

3. The crash cushion of claim 1, wherein said deformable attenuator member has a proximal end and a distal end, wherein said proximal end is longitudinally spaced downstream from said deflecting member, and said distal end is longitudinally spaced downstream of said proximal end.

4. The crash cushion of claim 3, wherein said at least one deformable attenuator member comprises a pair of deformable attenuator members, wherein said proximal ends of said deformable attenuator members are staggered at different distances from said input portion of said at least one deflecting member.

5. The crash cushion of claim 1, wherein said at least one deflecting member is a deforming member having a leading edge at said input portion and a trailing edge at said output portion, wherein said leading edge is non-parallel to said trailing edge.

6. The crash cushion of claim 1, wherein said first end is configured to be releasably secured to a vehicle.

7. The crash cushion of claim 1, wherein said first end is configured to be fixedly secured to a vehicle.

8. The crash cushion of claim 1, wherein said first end is configured to be fixedly secured to an immovable surface.

9. The crash cushion of claim 1 wherein said energy absorbing member comprises at least a pair of laterally spaced deformable attenuator members extending in a longitudinal direction, wherein at least a portion of said deformable attenuator members are bent in a non-outboard direction as said impact member is moved from said pre-impact position to said impact position.

10. The crash cushion of claim 9, wherein said first end comprises a deformable attachment member configured to deform in a non-outboard direction when said impact member is loaded unevenly.

11. The crash cushion of claim 9, further comprising a deforming member engaged with at least a portion of one of said deformable attenuator members downstream of said impact member.

12. The crash cushion of claim 9, wherein said at least said pair of laterally spaced deformable attenuator members comprises a first pair of laterally spaced deformable attenuator members vertically spaced from a second pair of laterally spaced deformable members.

13. A crash cushion comprising:
  a first end;
  an impact member movably located at a second end and longitudinally spaced from said first end;
  an energy absorbing member disposed between said second end and said first end, and configured to absorb energy when said impact member is moved from a pre-impact position to an impact position located toward said first end, wherein said energy absorbing member comprises at least a pair of laterally spaced deformable attenuator members extending in a longitudinal direction, wherein at least a portion of said deformable attenuator members are bent in a non-outboard direction as said impact member is moved from said pre-impact position to said impact position;

an impact surface located on said impact member, wherein said impact surface comprises a substantially central portion lying substantially in a laterally extending vertical plane, and opposite side portions extending laterally outward and longitudinally toward said first end from said central portion such that each of said side portions is non-parallel to said vertical plane; and a cross-brace frame, wherein said cross-brace frame is coupled to said deformable attenuator members at an intermediate portion thereby reducing the effective column length of the deformable attenuator members.

14. A crash cushion comprising:

a first end;

an impact member movably located at a second end and longitudinally spaced from said first end;

an energy absorbing member disposed between said second end and said first end, and configured to absorb energy when said impact member is moved from a pre-impact position to an impact position located toward said first end, wherein said energy absorbing member comprises at least a pair of laterally spaced deformable attenuator members extending in a longitudinal direction, wherein at least a portion of said deformable attenuator members are bent in a non-outboard direction as said impact member is moved from said pre-impact position to said impact position;

an impact surface located on said impact member, wherein said impact surface comprises a substantially central portion lying substantially in a laterally extending vertical plane, and opposite side portions extending laterally outward and longitudinally toward said first end from said central portion such that each of said side portions is non-parallel to said vertical plane; and at least a pair of deforming members coupled to opposite sides of said impact member, each of said pair of members comprising an inboard deforming member positioned adjacent to an inboard side of one of said deformable attenuator members and an outboard deforming member positioned adjacent to an outboard side of said one of said deformable attenuator members, wherein said outboard deforming member is positioned longitudinally downstream from said inboard deforming member.

15. A crash cushion comprising:

a first end an impact member movably located at a second end and longitudinally spaced from said first end;

an energy absorbing member disposed between said second end and said first end, and configured to absorb energy when said impact member is moved from a pre-impact position to an impact position located toward said first end, wherein said energy absorbing member comprises at least a pair of laterally spaced deformable attenuator members extending in a longitudinal direction, wherein at least a portion of said deformable attenuator members are bent in a non-outboard direction as said impact member is moved from said pre-impact position to said impact position;

an impact surface located on said impact member, wherein said impact surface comprises a substantially central portion lying substantially in a laterally extending vertical plane, and opposite side portions extending laterally outward and longitudinally toward said first end from said central portion such that each of said side portions is non-parallel to said vertical plane; and a deforming member engaged with at least a portion of one of said deformable attenuator members downstream of said impact member, wherein said deforming member comprises at least one shaping member engaging said at least a portion of said one of said deformable attenuator members, wherein said shaping member is positioned along an axis neutral to the bending moment resulting from said bending of said one of said deformable attenuating members in said non-outboard direction.

16. A crash cushion comprising:

a first end;

an impact member movably located at a second end and longitudinally spaced from said first end;

an energy absorbing member disposed between said second end and said first end, and configured to absorb energy when said impact member is moved from a pre-impact position to an impact position located toward said first end, wherein said energy absorbing member comprises at least a pair of laterally spaced deformable attenuator members extending in a longitudinal direction, wherein at least a portion of said deformable attenuator members are bent in a non-outboard direction as said impact member is moved from said pre-impact position to said impact position, and wherein said at least said pair of laterally spaced deformable attenuator members comprises a first pair of laterally spaced deformable attenuator members vertically spaced from a second pair of laterally spaced deformable members; and an impact surface located on said impact member, wherein said impact surface comprises a substantially central portion lying substantially in a laterally extending vertical plane, and opposite side portions extending laterally outward and longitudinally toward said first end from said central portion such that each of said side portions is non-parallel to said vertical plane;

wherein each of said vertically spaced deformable attenuator members have a proximal end and a distal end, wherein said proximal ends of said first and second pairs of deformable attenuator members are staggered at different distances from said impact surface.

17. A crash cushion comprising:

a first end;

an impact member movably located at a second end and longitudinally spaced from said first end, said impact member comprising at least one deflecting member having an input portion and an output portion;

an energy absorbing member disposed between said second end and said first end, and configured to absorb energy when said impact member is moved from a pre-impact position to an impact position located toward said first end, said energy absorbing member comprising at least one deformable attenuator member extending in a longitudinal direction, wherein said deformable attenuator member moves along said at least one deflecting member from said input portion to said output portion as said impact member is moved from said pre-impact position to said impact position; and an impact surface located on said impact member, wherein said impact surface comprises a substantially central portion lying substantially in a laterally extending vertical plane, and opposite side portions extending laterally outward and longitudinally toward said first end from said central portion such that each of said side portions is non-parallel to said vertical plane; wherein said at least one deflecting member is a bending tube that is disposed around at least a portion of said deformable attenuator member, and said output portion of said bending tube is non-parallel to said inlet portion of said bending tube.

18. A crash cushion comprising:
a first end;
an impact member movably located at a second end and longitudinally spaced from said first end;
an energy absorbing member disposed between said second end and said first end, and configured to absorb energy when said impact member is moved from a pre-impact position to an impact position located toward said first end, wherein said energy absorbing member comprises at least a pair of laterally spaced deformable attenuator members extending in a longitudinal direction, wherein at least a portion of said deformable attenuator members are bent in a non-outboard direction as said impact member is moved from said pre-impact position to said impact position;
an impact surface located on said impact member, wherein said impact surface comprises a substantially central portion lying substantially in a laterally extending vertical plane, and opposite side portions extending laterally outward and longitudinally toward said first end from said central portion such that each of said side portions is non-parallel to said vertical plane; and
a secondary deformable attenuator member disposed within one of said deformable attenuator members and extending in a longitudinal direction, wherein at least a portion of said secondary deformable attenuator member is configured to bend when said impact member is moved from said pre-impact position to said impact position.

19. The crash cushion of claim 18, wherein said secondary deformable attenuator member is shorter in length than said one of said deformable attenuator members.

* * * * *